US012738006B2

(12) United States Patent
Midorikawa et al.

(10) Patent No.: US 12,738,006 B2
(45) Date of Patent: Sep. 15, 2026

(54) IMAGE PROCESSING APPARATUS, CONTROL METHOD THEREFOR, IMAGE CAPTURING APPARATUS, AND STORAGE MEDIUM

(71) Applicant: CANON KABUSHIKI KAISHA, Tokyo (JP)

(72) Inventors: Keisuke Midorikawa, Tokyo (JP); Yasuhiko Iwamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 897 days.

(21) Appl. No.: 18/156,872

(22) Filed: Jan. 19, 2023

(65) Prior Publication Data

US 2023/0237758 A1 Jul. 27, 2023

(30) Foreign Application Priority Data

Jan. 21, 2022 (JP) ................................ 2022-007909

(51) Int. Cl.
*G06V 10/25* (2022.01)
*G06T 7/20* (2017.01)
(Continued)

(52) U.S. Cl.
CPC ................ *G06V 10/25* (2022.01); *G06T 7/20* (2013.01); *G06T 7/70* (2017.01); *G06V 10/761* (2022.01);
(Continued)

(58) Field of Classification Search
CPC .... G06V 10/25; G06V 10/761; G06V 40/161; G06V 40/18; G06V 10/764; G06T 7/20; G06T 2207/30201
See application file for complete search history.

(56) References Cited

U.S. PATENT DOCUMENTS 11,048,919 B1 * 6/2021 Modolo ................. G06V 20/40
2014/0247374 A1 * 9/2014 Murakami ........... H04N 23/635 348/222.1
2021/0366131 A1 * 11/2021 Matsuda ................ H04N 23/60

FOREIGN PATENT DOCUMENTS

JP 2016001447 A 1/2016
JP 2016156934 A 9/2016
(Continued)

OTHER PUBLICATIONS

S. Haykin, Neural Networks: A Comprehensive Foundation, 2nd Edition, Prentice Hall, Jul. 1998.
(Continued)

*Primary Examiner* — David Perlman
(74) *Attorney, Agent, or Firm* — Canon U.S.A., Inc. IP Division

(57) ABSTRACT

An image capturing apparatus acquires successive images in a time-series manner and performs image processing thereon. The image capturing apparatus detects a first region (for example, a face) of a subject from an image, and detects a second region (for example, a torso) of a subject from an image. The image capturing apparatus performs processing for searching for a detection result which is obtained from a current image with use of a detection result obtained from a previously acquired image and classifying detection results each satisfying a condition according to subject. In the search processing, identical-region search, which uses detection results of an identical region between the previously acquired image and the current image, is performed in preference to different-region search, which uses detection results of different regions between the previously acquired image and the current image.

23 Claims, 16 Drawing Sheets

(51) Int. Cl.
*G06T 7/70* (2017.01)
*G06V 10/74* (2022.01)
*G06V 10/764* (2022.01)
*G06V 40/16* (2022.01)
*G06V 40/18* (2022.01)

(52) U.S. Cl.
CPC .......... *G06V 10/764* (2022.01); *G06V 40/161* (2022.01); *G06V 40/18* (2022.01); *G06T 2207/30201* (2013.01)

(56) References Cited

FOREIGN PATENT DOCUMENTS

| | | | |
|---|---|---|---|
| JP | 2019041414 | A | 3/2019 |
| JP | 2020095702 | A | 6/2020 |
| JP | 2021144749 | A | 9/2021 |
| JP | 2021164006 | A | 10/2021 |

OTHER PUBLICATIONS

Alejandro Newell, et al., Associative Embedding: End-to-End Learning for Joint Detection and Grouping, Neural Information Processing Systems, 2017.

* cited by examiner

FIG.1

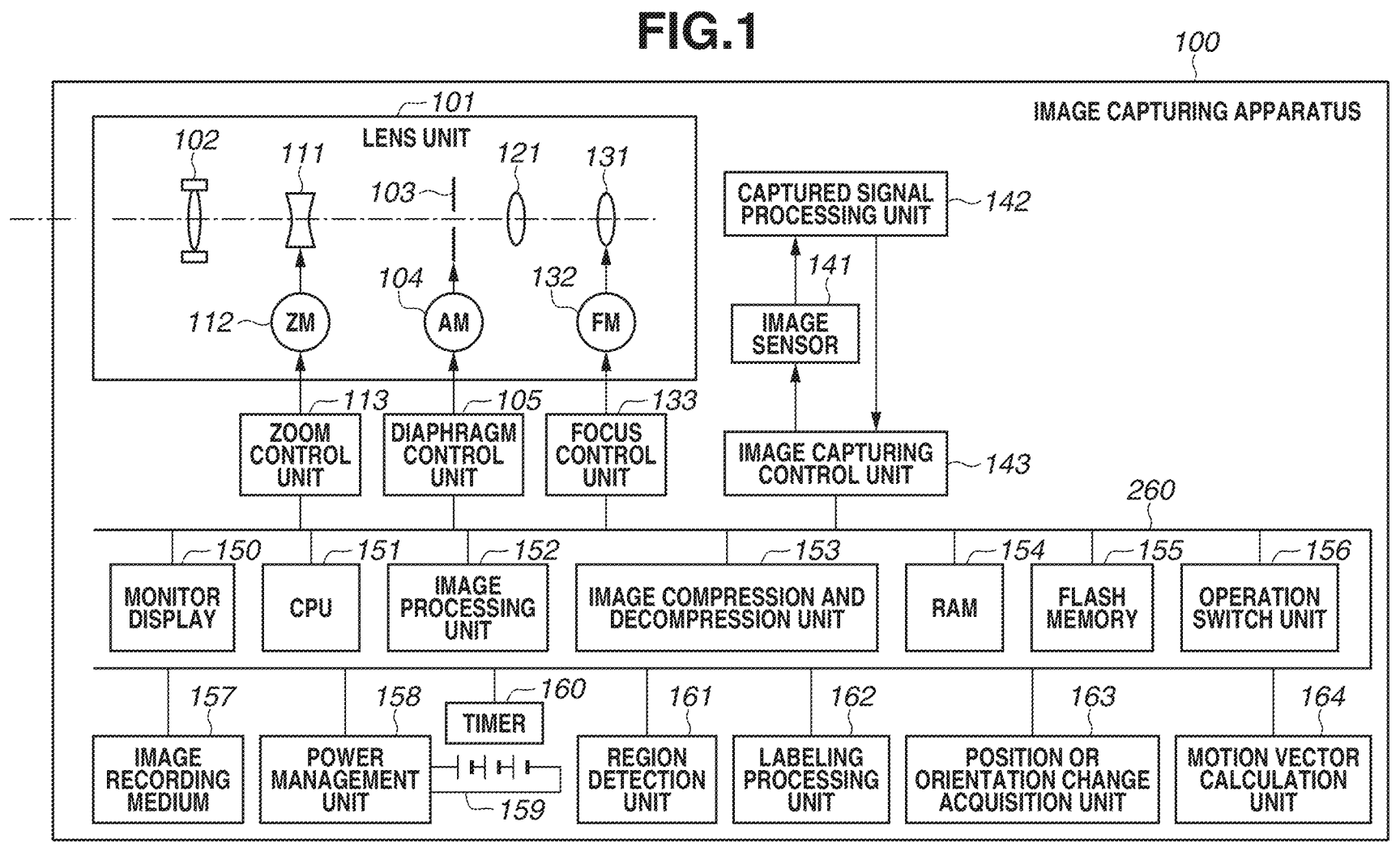

100
IMAGE CAPTURING APPARATUS
101 LENS UNIT
102
103
104 AM
105 DIAPHRAGM CONTROL UNIT
111
112 ZM
113 ZOOM CONTROL UNIT
121
131
132 FM
133 FOCUS CONTROL UNIT
141 IMAGE SENSOR
142 CAPTURED SIGNAL PROCESSING UNIT
143 IMAGE CAPTURING CONTROL UNIT
150 MONITOR DISPLAY
151 CPU
152 IMAGE PROCESSING UNIT
153 IMAGE COMPRESSION AND DECOMPRESSION UNIT
154 RAM
155 FLASH MEMORY
156 OPERATION SWITCH UNIT
157 IMAGE RECORDING MEDIUM
158 POWER MANAGEMENT UNIT
159
160 TIMER
161 REGION DETECTION UNIT
162 LABELING PROCESSING UNIT
163 POSITION OR ORIENTATION CHANGE ACQUISITION UNIT
164 MOTION VECTOR CALCULATION UNIT
260

300
311
312
313
321
323

301
331
332
333
334

302
311
312
313
321
323

303
SUBJECT ID
DETECTION-1 AREA
DETECTION-2 AREA
C
313
323
B
312
A
311
321

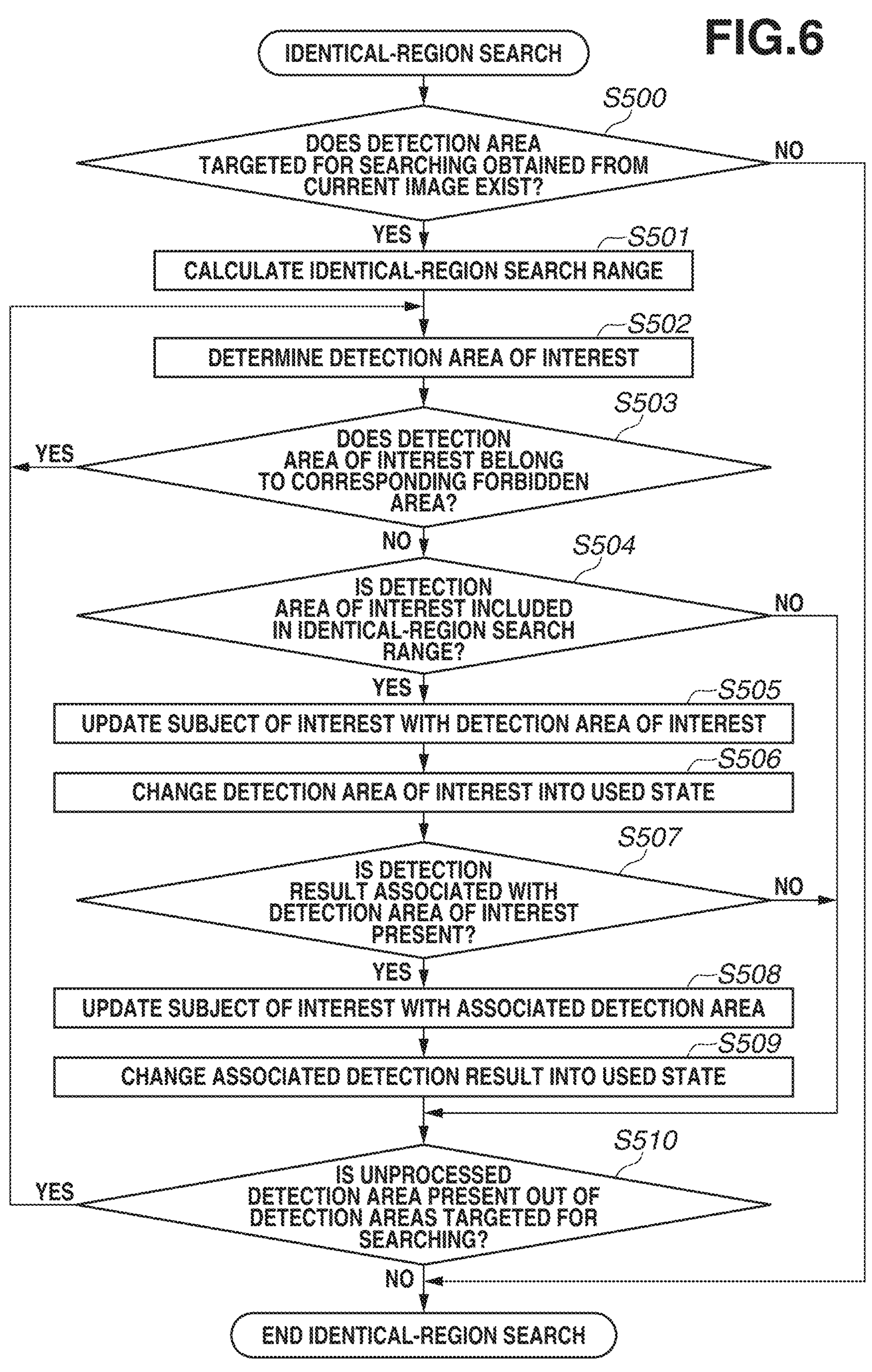
FIG.6
IDENTICAL-REGION SEARCH
S500
DOES DETECTION AREA TARGETED FOR SEARCHING OBTAINED FROM CURRENT IMAGE EXIST?
NO
YES
S501
CALCULATE IDENTICAL-REGION SEARCH RANGE
S502
DETERMINE DETECTION AREA OF INTEREST
S503
DOES DETECTION AREA OF INTEREST BELONG TO CORRESPONDING FORBIDDEN AREA?
YES
NO
S504
IS DETECTION AREA OF INTEREST INCLUDED IN IDENTICAL-REGION SEARCH RANGE?
NO
YES
S505
UPDATE SUBJECT OF INTEREST WITH DETECTION AREA OF INTEREST
S506
CHANGE DETECTION AREA OF INTEREST INTO USED STATE
S507
IS DETECTION RESULT ASSOCIATED WITH DETECTION AREA OF INTEREST PRESENT?
NO
YES
S508
UPDATE SUBJECT OF INTEREST WITH ASSOCIATED DETECTION AREA
S509
CHANGE ASSOCIATED DETECTION RESULT INTO USED STATE
S510
IS UNPROCESSED DETECTION AREA PRESENT OUT OF DETECTION AREAS TARGETED FOR SEARCHING?
YES
NO
END IDENTICAL-REGION SEARCH

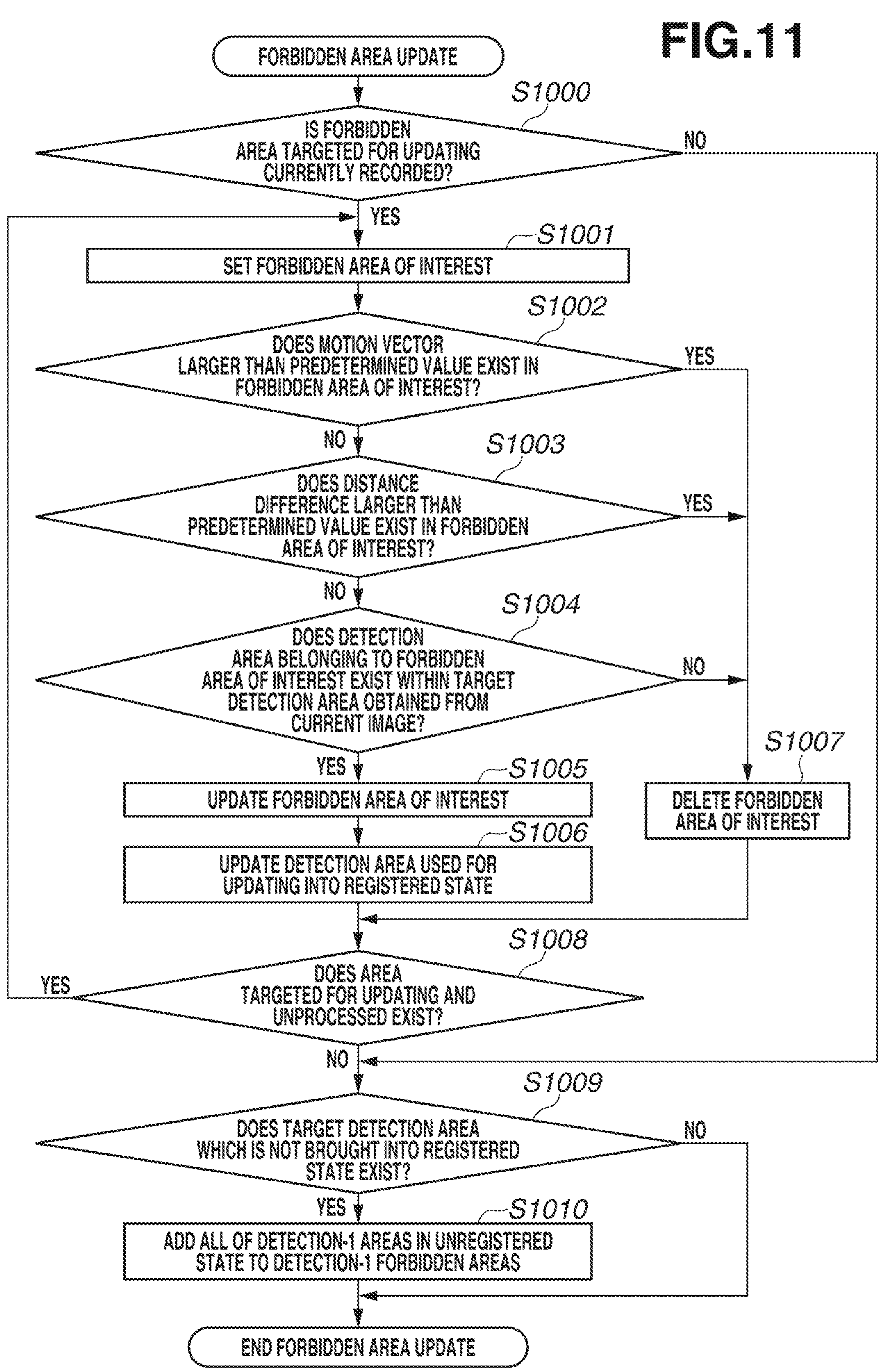
FIG.11
FORBIDDEN AREA UPDATE
S1000
IS FORBIDDEN AREA TARGETED FOR UPDATING CURRENTLY RECORDED?
NO
YES
S1001
SET FORBIDDEN AREA OF INTEREST
S1002
DOES MOTION VECTOR LARGER THAN PREDETERMINED VALUE EXIST IN FORBIDDEN AREA OF INTEREST?
YES
NO
S1003
DOES DISTANCE DIFFERENCE LARGER THAN PREDETERMINED VALUE EXIST IN FORBIDDEN AREA OF INTEREST?
YES
NO
S1004
DOES DETECTION AREA BELONGING TO FORBIDDEN AREA OF INTEREST EXIST WITHIN TARGET DETECTION AREA OBTAINED FROM CURRENT IMAGE?
NO
YES
S1005
UPDATE FORBIDDEN AREA OF INTEREST
S1007
DELETE FORBIDDEN AREA OF INTEREST
S1006
UPDATE DETECTION AREA USED FOR UPDATING INTO REGISTERED STATE
S1008
DOES AREA TARGETED FOR UPDATING AND UNPROCESSED EXIST?
YES
NO
S1009
DOES TARGET DETECTION AREA WHICH IS NOT BROUGHT INTO REGISTERED STATE EXIST?
NO
YES
S1010
ADD ALL OF DETECTION-1 AREAS IN UNREGISTERED STATE TO DETECTION-1 FORBIDDEN AREAS
END FORBIDDEN AREA UPDATE FIG.12A
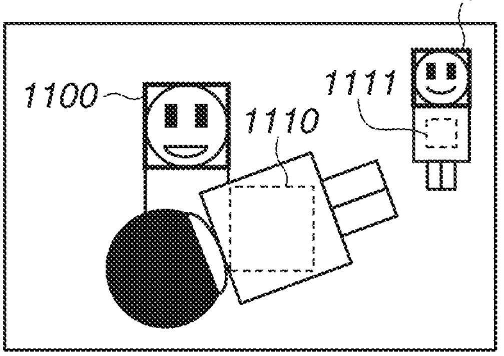
FIG.12B
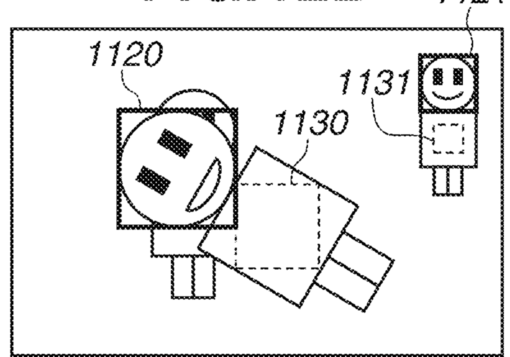
FIG.12C
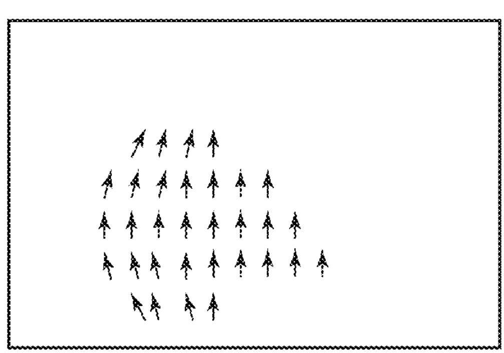
FIG.12D
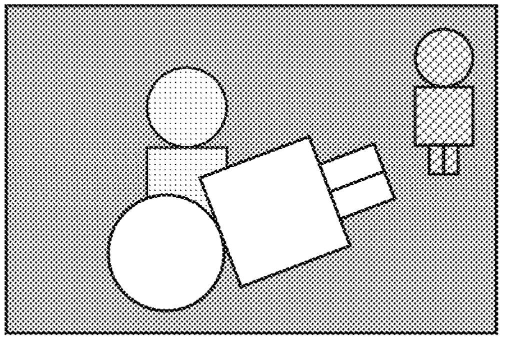
FIG.12E
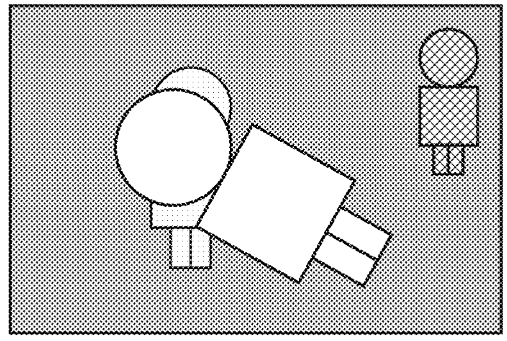
FIG.12F
| DETECTION-1 FORBIDDEN AREA | DETECTION-2 FORBIDDEN AREA |
|---|---|
| 1100 | |
| 1102 | 1111 |
FIG.12G
| SUBJECT ID | DETECTION-1 AREA | DETECTION-2 AREA |
|---|---|---|
| C | 1120 | 1130 |
| A | 1121 | 1131 |

IMAGE PROCESSING APPARATUS, CONTROL METHOD THEREFOR, IMAGE CAPTURING APPARATUS, AND STORAGE MEDIUM

BACKGROUND OF THE DISCLOSURE

Field of the Disclosure

Aspects of the present disclosure generally relate to an image capturing apparatus and, particularly, detection of a region of a subject.

Description of the Related Art

In detection processing for a subject in an image capturing apparatus, with respect to each of images serially acquired in a time-series manner, an area corresponding to a region such as a face is detected. Then, search processing for setting, as a search range, a predetermined range beginning at a detection result of a previously acquired image and thus obtaining a detection result of the current image is performed. In the search processing, based on the same subject existing at near positions in successive images, respective detection results each satisfying a search condition are associated with each other as detection results of the same subject. Japanese Patent Application Laid-Open No. 2019-41414 discusses a technique to prevent or reduce an erroneous detection by determining detection results of a plurality of frames, which are associated with each other as detection results of the same subject, while combining the detection results with each other.

SUMMARY OF THE DISCLOSURE

According to an aspect of the present disclosure, an image processing apparatus includes an acquisition unit configured to acquire a captured image, a detection unit configured to detect a plurality of regions of a subject from the image, and a search unit configured to search, with use of a detection result obtained from a previously acquired first image, for a detection result which is obtained from a current second image and classify detection results each satisfying a condition according to subject, wherein, in a case where the search unit performs different-region search, which uses detection results of different regions between the first image and the second image, and identical-region search, which uses detection results of an identical region between the first image and the second image, the search unit performs the identical-region search in preference to the different-region search.

Further features of the present disclosure will become apparent from the following description of exemplary embodiments with reference to the attached drawings.

BRIEF DESCRIPTION OF THE DRAWINGS

FIG. 1 is a block diagram illustrating a configuration of an image capturing apparatus in a first exemplary embodiment.

FIG. 6 is a flowchart of identical-region search processing in the first exemplary embodiment.

FIG. 11 is a flowchart of forbidden-area update processing in the first exemplary embodiment.

FIGS. 12A, 12B, 12C, 12D, 12E, 12F and 12G are schematic diagrams of examples of forbidden-area deletion in the first exemplary embodiment.

DESCRIPTION OF THE EMBODIMENTS

Figure 2:
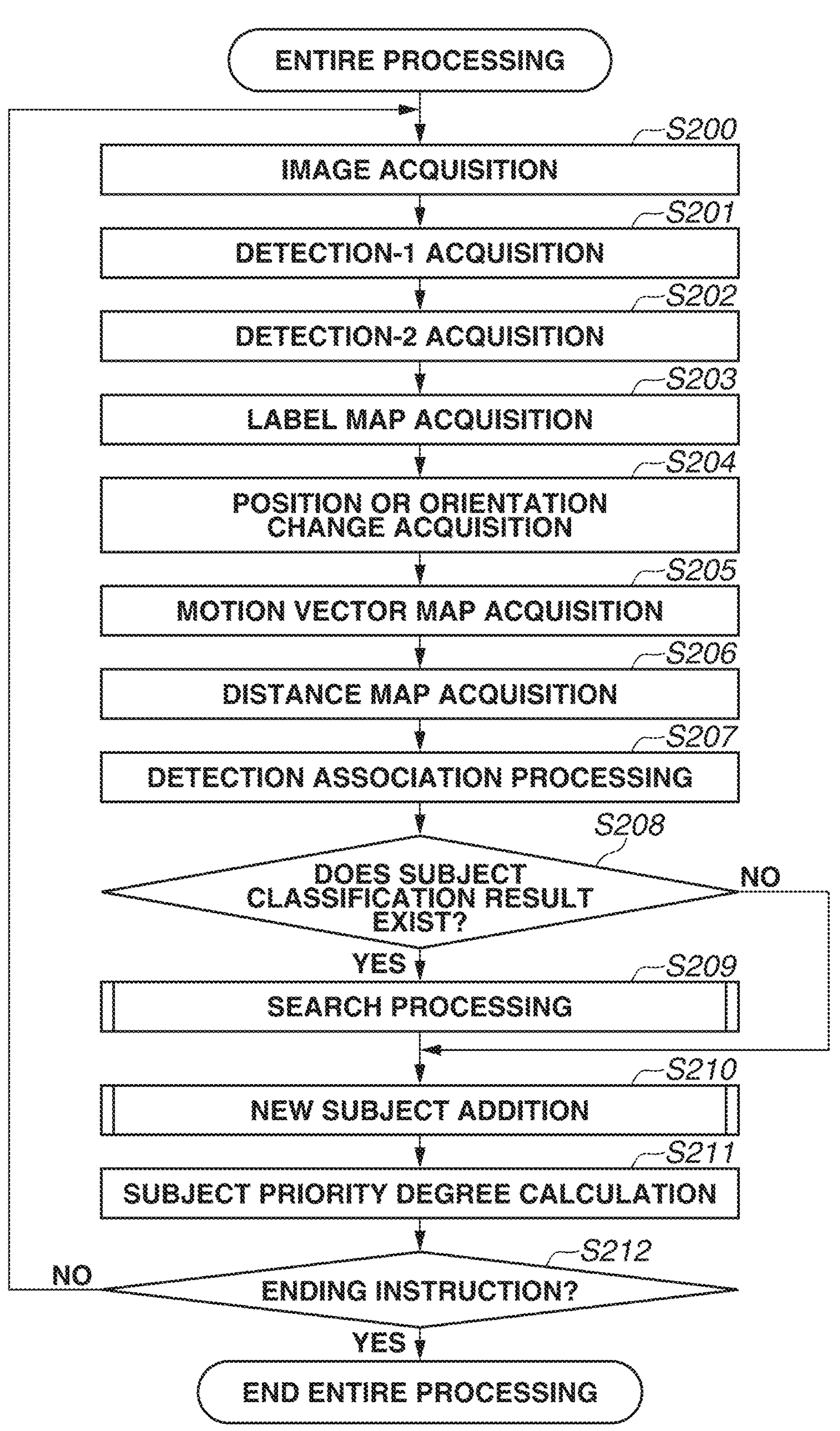
FIG. 2 is a flowchart of entire processing in the first exemplary embodiment.

Suppose an image capturing scene in which a subject moves violently as in, for example, artistic gymnastics, and occlusion occurs frequently in a specific region thereof. In this case, newly providing a unit for detecting not only the face of the subject but also a region thereof different from the face, such as the torso thereof enables increasing the detection rate for the subject.

In conventional techniques, it is difficult to perform search processing which satisfies a predetermined accuracy condition in a configuration including a plurality of detection units. In the case of classifying a plurality of regions according to subject, if a detection result of a region which should be originally classified into a first subject is classified into a region of a second subject by mistake, the detection accuracy for subjects may decrease. Aspects of the present disclosure are generally directed to providing an image processing apparatus capable of classifying detection results of a plurality of regions according to subject with a higher degree of accuracy.

Various exemplary embodiments, features, and aspects of the present disclosure will be described in detail below with reference to the drawings. In exemplary embodiments, an example of an image capturing apparatus to which an image processing apparatus in aspects of the present disclosure is applied is described. In the image capturing apparatus, detection results of regions of a subject in an image are used for, for example, automatic focus adjustment control or subject tracking control and are presented to the user with use of, for example, a display frame in the image. For example, suppose a case of searching for the torso area of a subject in a current image beginning at the face area of a subject in a previously acquired image. Since the face and the torso are intrinsically planate in images thereof between such regions and are distant from each other, it is necessary to appropriately shape a search range. Simply broadening the search range may result in associating a region detection result of a subject with a detection result of another subject by mistake. In the following description, processing for preventing or reducing a region detection result of a subject from being classified erroneously and for performing high-accuracy classification for each subject with respect to detection results is described.

A configuration example of an image capturing apparatus in the first exemplary embodiment is described with reference to FIG. 1. FIG. 1 is a block diagram illustrating a configuration of the image capturing apparatus 100. The image capturing apparatus 100 is, for example, a digital still camera or video camera capable of performing image capturing of a subject and recording the captured image of the subject on a recording medium. Data about a moving image or still image is recorded on, for example, a magnetic tape, a solid-state memory, an optical disc, or a magnetic disc. Various units included in the image capturing apparatus 100 are interconnected via a bus 260. The respective units are controlled by a central processing unit (CPU) 151.

A lens unit 101 includes a fixed first-group lens 102, a zoom lens 111, a diaphragm 103, a fixed third-group lens 121, and a focus lens (a lens for focus adjustment) 131. A diaphragm control unit 105 drives the diaphragm 103 via a diaphragm motor (AM) 104 according to a command output from the CPU 151, thus adjusting the aperture diameter of the diaphragm 103 to perform light quantity control for image capturing. A zoom control unit 113 drives the zoom lens 111 via a zoom motor (ZM) 112, thus changing the focal length.

A focus control unit 133 determines an amount of driving of a focus motor (FM) 132 based on a focusing state detection result of the lens unit 101, i.e., an amount of deviation in focus adjusting direction (a defocus amount). The focus control unit 133 drives the focus lens 131 via the focus motor 132 based on the determined amount of driving, thus controlling the focusing state.

Autofocus (AF) control is implemented by movement control of the focus lens 131, which is performed by the focus control unit 133 and the focus motor 132. In FIG. 1, the focus lens 131 is illustrated as a single lens element in a simplified manner, but, usually, is configured with a plurality of lens elements.

A subject image (optical image) formed on an image sensor 141 via the lens unit 101 is converted into an electrical signal by the image sensor 141. The image sensor 141 includes photoelectric conversion elements, which perform photoelectric conversion with respect to a subject image. The image sensor 141 has a configuration in which m pixels are arranged in the width direction and n pixels are arranged in the height direction and, for example, a plurality of microlenses and two photoelectric conversion elements corresponding to each microlens are arranged in a light-receiving area. An image signal obtained by the image sensor 141 performing photoelectric conversion is shaped into predetermined image data by a captured signal processing unit 142. The captured signal processing unit 142 adds together outputs of two photoelectric conversion elements, thus being able to acquire image data on an imaging plane.

Moreover, the captured signal processing unit 142 is able to two images having parallax (parallax images) from outputs of two photoelectric conversion elements. In the first exemplary embodiment, an A+B image signal is assumed to be obtained by adding together outputs of two photoelectric conversion elements, and an A-image signal and a B-image signal are assumed to be acquired from respective outputs of two photoelectric conversion elements.

A monitor display 150 includes a display device and performs, for example, displaying of a captured image and displaying of a rectangular frame for an object detection result. Image data output from the captured signal processing unit 142 is sent to an image capturing control unit 143 and is then temporarily accumulated in a random access memory (RAM) 154. Image data accumulated in the RAM 154 is compressed by an image compression and decompression unit 153 and is then recorded on an image recording medium 157. In parallel with this processing, image data accumulated in the RAM 154 is sent to an image processing unit 152.

An operation switch unit 156 is an input interface unit including, for example, a touch panel and buttons, which the user operates. The user is allowed to issue a desired instruction to the image capturing apparatus 100 by performing a selection operation for various function icons displayed on the monitor display 150.

The CPU 151 performs setting processing for the image sensor 141 based on an operation instruction input by the user via the operation switch unit 156 or the magnitude of a pixel signal concerning image data temporarily accumulated in the RAM 154. For example, the CPU 151 determines an accumulation time for the image sensor 141 and a setting value for gain which is used for performing outputting from the image sensor 141 to the captured signal processing unit 142. The image capturing control unit 143 receives instructions for the accumulation time and the setting value for gain from the CPU 151 and controls the image sensor 141 based on the instructions. With regard to control of an image capturing optical system, the CPU 151 causes the focus control unit 133 to perform AF control with respect to a specific subject area. Moreover, the CPU 151 causes the diaphragm control unit 105 to perform exposure control using the luminance value of the specific subject area.

The image processing unit 152 acquires image data and performs, for example, reduction processing or enlargement processing into an optimum size with respect to the image data. The image data processed into an optimum size is sent to and displayed on the monitor display 150 as needed, so that preview image displaying or through-image displaying is performed. Moreover, an object detection result obtained by a region detection unit 161 can also be displayed in superimposition on an image displayed on the monitor display 150. Moreover, using the RAM 154 as a ring buffer enables performing buffering a plurality of pieces of image data captured within a predetermined period or a processing result obtained by each unit corresponding to each image data.

The image processing unit 152 is able to generate a defocus map or a reliability map based on A-image data and B-image data acquired from the image sensor 141. The defocus map is a map which has information about the defocus amount for each pixel and in which each defocus amount is expressed in units of Fδ (F: aperture diameter, δ: diameter of permissible circle of confusion). The reliability map is a map in which the defocus map is associated with each coordinate position and which has information about reliability representing the degree of reliability of the defocus amount for each pixel. The defocus map is an example of information representing a depth distribution in the depth direction of an image, for which information representing a distribution of distance information, such as an image deviation amount map, a distance map, or a distance image, which is acquired from a plurality of viewpoint images different in viewpoint, is able to be used. Furthermore, the method of generating the defocus map and the reliability map can include a method discussed in Japanese Patent Application Laid-Open No. 2016-156934 and, therefore, the detailed description thereof is omitted.

A flash memory 155 stores, for example, a control program required for operations of the image capturing apparatus 100 and parameters used for operations of the respective units. When the image capturing apparatus 100 is started up by a user operation and, thus, the image capturing apparatus 100 transitions from a power-off state to a power-on state, the control program and parameters stored in the flash memory 155 are read into a part of the RAM 154. The CPU 151 controls operations of the image capturing apparatus 100 according to the control programs and constants loaded onto the RAM 154. The image recording medium 157 allows, for example, image data and data related to images to be recorded thereon.

A battery 159, which is appropriately controlled by a power management unit 158, performs stable power supply to the entire image capturing apparatus 100. A timer 160 is a clocking device capable of acquiring relative time in units of millisecond (ms) in synchronization with processing performed by each unit.

The region detection unit 161 detects a plurality of areas corresponding to a predetermined region of the subject with use of an image signal. Region detection in the region detection unit 161 is able to be implemented by, for example, feature extraction processing using a convolutional neural network (CNN). More specifically, a method described in S. Haykin, "Neural Networks: A Comprehensive Foundation 2nd Edition", Prentice Hall, pp. 156-255, July 1998 can be used. Moreover, switching weights of a feature detection cell surface in the CNN enables detecting various types of subjects and various regions of subjects. Furthermore, in implementing the present disclosure, an optional method can be used for region detection processing. In the first exemplary embodiment, a detector is assumed to estimate and output the reliability of a rectangle area of a detection target and a detection result, and, in a case where the reliability is less than a given threshold value, the detection result is assumed to be discarded. The threshold value can be determined by an optional method. For example, the threshold value can be a preliminarily adjusted fixed value. Alternatively, if a threshold value is previously set for each region of the subject and a given region is detected with a degree of reliability greater than or equal to the threshold value, processing for decreasing a threshold value for a different region in the same image or a subsequent image at a given rate can be performed. Additionally, the above-mentioned processing can be configured to be limited to a case where a distance between detection results of the respective different regions is within a predetermined range or can be configured to decrease the threshold value in a case where it has been estimated that the likelihood of being the same subject is high by labeling processing or a region vector described below.

A labeling processing unit 162 generates, with respect to an image, a label map separated for each subject in the image. More specifically, a method described in Alejandro Newell, Zhiao Huang, Jia Deng, Associative Embedding: End-to-End Learning for Joint Detection and Grouping, Neural Information Processing Systems, 2017 can be used. In a case where detection results of a plurality of regions are able to be obtained by the region detection unit 161, comparing the detection results with a label map enables associating detection results of a plurality of regions with each other.

A position or orientation change acquisition unit 163 includes a position and orientation sensor, such as a gyroscope sensor, an acceleration sensor, or an electronic compass, and measures a position or orientation change of the image capturing apparatus 100 relative to an image capturing scene. Data about the acquired position or orientation change is then stored in the RAM 154.

A motion vector calculation unit 164 performs calculation processing for calculating a motion vector from image signals corresponding to two images serially acquired in a time-series manner. In the calculation processing for a motion vector, feature point matching processing between a past frame and a current frame is performed with respect to a plurality of positions in an image, so that a plurality of motion vectors is detected.

The flow of entire processing in the first exemplary embodiment is described with reference to FIG. 2. In the first exemplary embodiment, the region detection unit 161 is assumed to be able to detect a face area and a torso area of a person serving as a subject, and detection 1 is assumed to be detection of the face area and detection 2 is assumed to be detection of the torso area. Moreover, the face area and the torso area of a person are assumed to be equal in degree of importance. Processing indicated in each step is implemented by the CPU 151 executing a program.

In step S200, image data acquired by the image capturing control unit 143 is supplied to various units. Moreover, clock time information about time at which the acquired image data has been supplied is also acquired from the timer 160 and is then recorded on the RAM 154.

In step S201, the region detection unit 161 performs detection processing with respect to the acquired image. A plurality of detection areas concerning the face area of the subject (hereinafter referred to as "detection-1 areas") and the respective reliabilities thereof are acquired. In step S202, the region detection unit 161 performs detection processing with respect to the acquired image. A plurality of detection areas concerning the torso area of the subject (hereinafter referred to as "detection-2 areas") and the respective reliabilities thereof are acquired.

In step S203, the labeling processing unit 162 performs labeling processing with respect to the acquired image. A label map including labels different for each subject area is acquired. In step S204, the position or orientation change acquisition unit 163 acquires data about a position or orientation change of the image capturing apparatus 100 in synchronization with the acquired image.

In step S205, the motion vector calculation unit 164 acquires a motion vector map with respect to the acquired image. In step S206, the image processing unit 152 acquires a defocus map and a reliability map. In step S207, the CPU 151 performs association processing for associating a plurality of detection-1 areas acquired in step S201 and a plurality of detection-2 areas acquired in step S202 with each other with use of the label map acquired in step S203. At this time, the CPU 151 sets each detection area the reliability in detection result of which is greater than or equal to a threshold value as a target for association processing and does not set (for example, in the state of this step, discards as data) each detection area the reliability in detection result of which is less than the threshold value as a target for association processing. In the first exemplary embodiment, with regard to the detection 1, the threshold value to be used is a preliminarily adjusted fixed value. With regard to the detection 2, two, large and small, threshold values are previously set, and, if it is determined that the detection 1 of the same subject exists, the threshold value to be used is the small threshold value and, if not so, the threshold value to be used is the large threshold value. Thus, in a case where another region has already been detected, the threshold value for detection in the identical-region search is set lower than in a case where another region has not been detected, so that detection is made easy to perform. The CPU 151 refers to the label map acquired in step S203 and, if the detection-1 area exists in the same label area as the detection-2 area of interest, the CPU 151 is able to determine that the detection 2 of the same subject exists. The association processing is described below.

In step S208, the CPU 151 determines whether a subject classification result concerning a previously acquired image exits. If it is determined that the subject classification result exists (YES in step S208), the CPU 151 advances the processing to step S209, and, if it is determined that the subject classification result does not exist (NO in step S208), the CPU 151 advances the processing to step S210.

In step S209, the CPU 151 performs search processing with respect to the respective detection areas obtained in step S201 and step S202 based on the subject classification result concerning the previously acquired image. As a result of searching, a subject classification result recorded on the RAM 154 is updated. The search processing is described below. Next to step S209, the CPU 151 advances the processing to step S210.

In step S210, the CPU 151 performs addition processing for adding a new subject. An area which has not been set to a used state in the search processing performed in step S209 from among the detection areas obtained in step S201 and step S202 is added as an area for a new subject to the subject classification result recorded on the RAM 154. The new subject addition is described below.

In step S211, the CPU 151 calculates a subject priority degree for each subject in the subject classification result recorded on the RAM 154. The subject priority degree is determined based on the size of the detection-1 area or the detection-2 area. As the size is lager, the subject priority degree is assumed to be higher.

In step S212, the CPU 151 determines whether an ending instruction has been issued by the operation switch unit 156 being operated. If it is determined that the ending instruction has been issued (YES in step S212), the CPU 151 ends the entire processing, and, if it is determined that the ending instruction has not been issued (NO in step S212), the CPU 151 returns the processing to step S200, so that a series of processing operation is repeatedly performed.

Operation examples of the entire processing are described with reference to FIGS. 3A, 3B, 3C, and 3D. In the following description, an image acquired by the image capturing apparatus 100 is referred to as an "acquired image". FIG. 3A illustrates examples of detection areas which are obtained in step S201 and step S202 illustrated in FIG. 2 with respect to an acquired image 300. In processing performed in step S201 illustrated in FIG. 2, face areas 311, 312, and 313 of three persons are acquired. In processing performed in step S202 illustrated in FIG. 2, torso areas 321 and 323 of two persons are acquired.

Figures 3A, 3B, 3C, 3D:
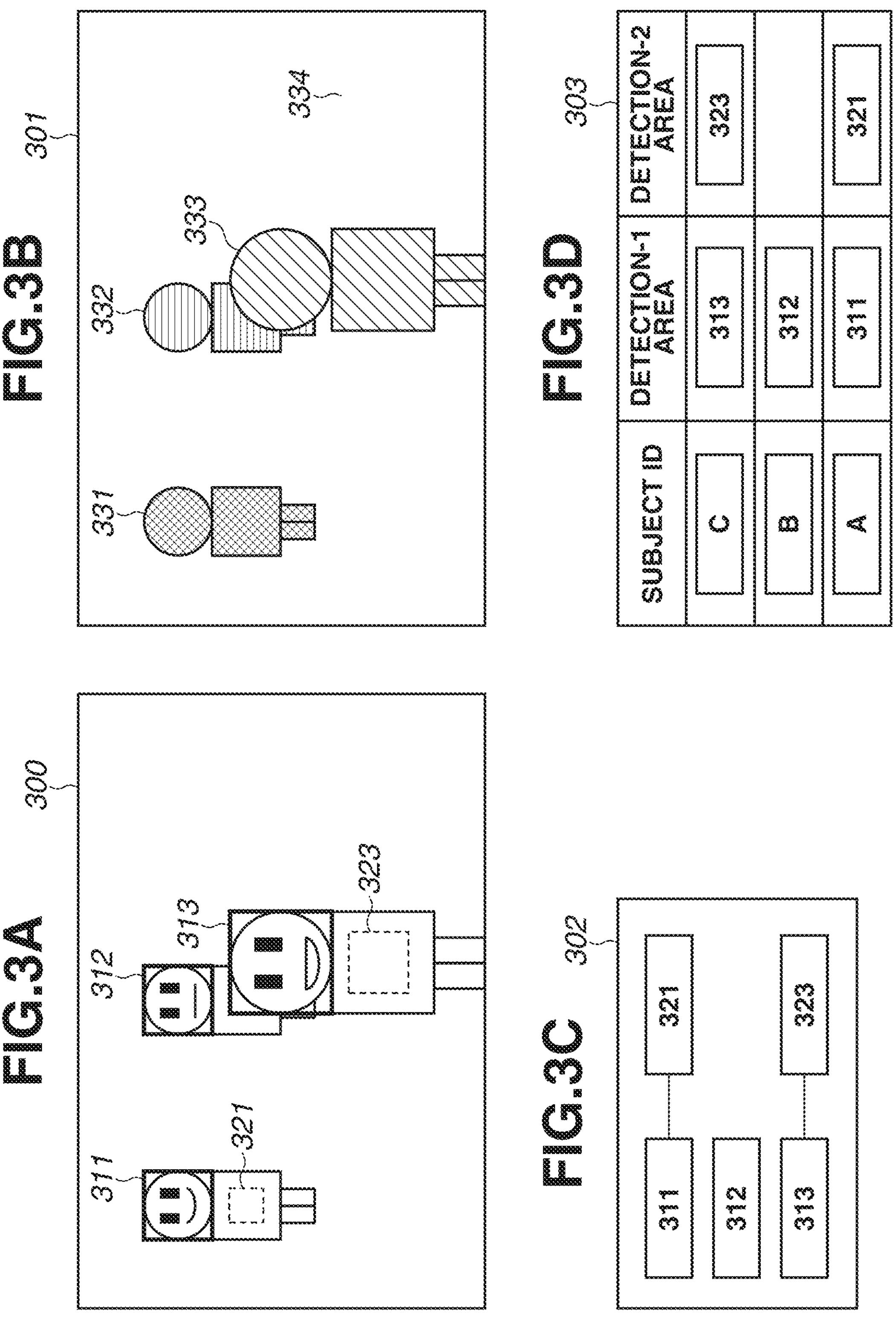
FIGS. 3A, 3B, 3C, and 3D are schematic diagrams of examples of entire processing in the first exemplary embodiment.

FIG. 3B illustrates an example of a label map which is acquired in step S203 illustrated in FIG. 2 in conformity with the acquired image 300. The label map 301 has coordinates corresponding to those of the acquired image 300, in which labels 331, 332, 333, and 334, which are capable of discriminating subject areas or background areas for each coordinate position, are stored. The labels 331, 332, and 333 are pieces of discrimination information respectively corresponding to subject areas of three persons. The label 334 is discrimination information corresponding to a background area.

FIG. 3C illustrates an example of a result of detection association processing which is performed with use of face areas, torso areas, and a label map. In the detection association processing, processing for referring to a label map for each of one detection area and searching for the other detection area belonging to the same label as that of one detection area is performed. For example, the face area 311 of a first person situated to the left side is associated with the torso area 321 belonging to the same label 331 as that of the face area 311. Since a torso area belonging to the same label 332 as that of the face area 312 of a second person situated at the center does not exist, the face area 312 is not associated with any torso area. The face area 313 of a third person situated at the near side is associated with the torso area 323 belonging to the same label 333 as that of the face area 313. Furthermore, as mentioned above, with regard to each of the torso area 321 and the torso area 323, since a face detection area belonging to the same label exists, a threshold value for determining whether to employ a detection result can be set lower (in such a way as to make a detection result more employable) than a case where a face detection area belonging to the same label does not exist. Conversely, a threshold value for a face detection result in which the same subject is estimated to exist when a torso area exists can be set lower (in such a way as to make a detection result more employable). In that case, a threshold value for the face area 312 is set higher than a threshold value for each of the face area 311 and the face area 313, to determine whether to employ or discard a detection result.

FIG. 3D illustrates an example of a subject classification result to be recorded in step S209 or step S210 illustrated in FIG. 2. The subject classification result includes pieces of information about a subject identification (ID), a detection-1 area, and a detection-2 area. "A", "B", and "C" as subject IDs are allocated to discriminate between the first, second, and third persons.

Figure 4:
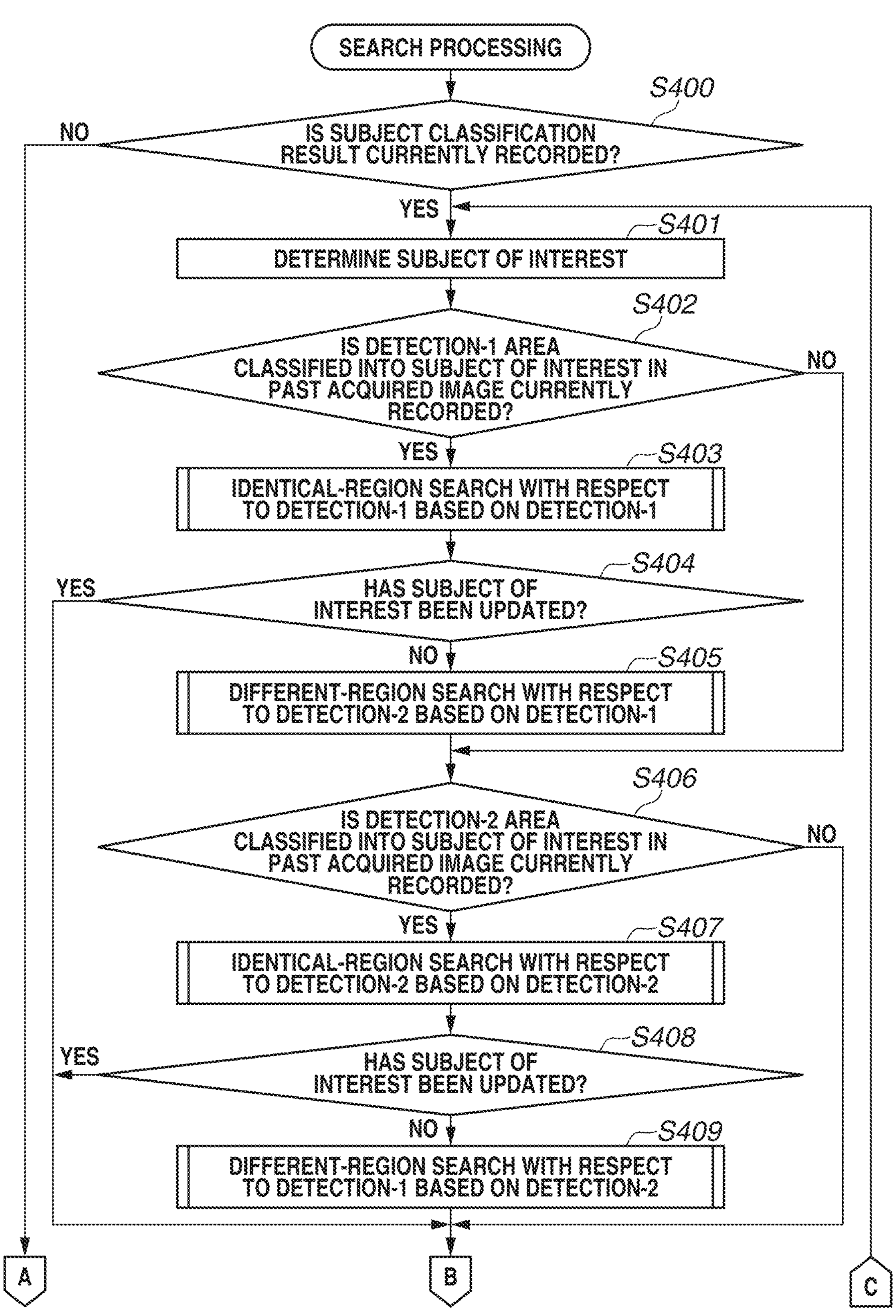
FIG. 4 is a flowchart of search processing in the first exemplary embodiment.

The search processing (step S209 illustrated in FIG. 2) in the first exemplary embodiment is described in detail with reference to FIG. 4 and FIG. 5. In step S400, the CPU 151 determines whether a subject classification result is currently recorded on the RAM 154 with regard to search processing for the past acquired image. If it is determined that the subject classification result is currently recorded on the RAM 154 (YES in step S400), the CPU 151 advances the processing to step S401, and, if it is determined that the subject classification result is not currently recorded on the RAM 154 (NO in step S400), the CPU 151 ends the search processing.

In step S401, the CPU 151 determines a subject of interest from a plurality of subject classification results corresponding to a plurality of subjects recorded on the RAM 154. In a case where a plurality of candidates for a subject of interest exists, a subject which is highest in the subject priority degree calculated in step S211 illustrated in FIG. 2 is prioritized.

In step S402, the CPU 151 determines whether a detection-1 area classified into a subject of interest in the past acquired image is currently recorded on the RAM 154. If it is determined that the detection-1 area is currently recorded (YES in step S402), the CPU 151 advances the processing to step S403, and, if it is determined that the detection-1 area is not currently recorded (NO in step S402), the CPU 151 advances the processing to step S406.

In step S403, the CPU 151 performs identical-region search processing. Based on the detection-1 area classified into a subject of interest in the past acquired image, the CPU 151 performs a search for an identical region with respect to a plurality of detection-1 areas obtained from a current image. The details of the identical-region search processing are described below.

In step S404, the CPU 151 determines whether an area satisfying a condition has been found out of detection areas of the current image and the subject classification result for the subject of interest has been updated therewith. If it is determined that the subject classification result for the subject of interest has been updated (YES in step S404), the CPU 151 advances the processing to step S410 illustrated in FIG. 5, and, if it is determined that the subject classification result for the subject of interest has not been updated (NO in step S404), the CPU 151 advances the processing to step S405.

In step S405, the CPU 151 performs different-region search processing. Based on the detection-1 area classified into a subject of interest in the past acquired image, the CPU 151 performs a search for a different region with respect to a plurality of detection-2 areas obtained from the current image. The details of the different-region search processing are described below.

In step S406, the CPU 151 determines whether a detection-2 area classified into a subject of interest in the past acquired image is currently recorded on the RAM 154. If it is determined that the detection-2 area is currently recorded (YES in step S406), the CPU 151 advances the processing to step S407, and, if it is determined that the detection-2 area is not currently recorded (NO in step S406), the CPU 151 advances the processing to step S410 illustrated in FIG. 5.

In step S407, the CPU 151 performs identical-region search processing. Based on the detection-2 area classified into a subject of interest in the past acquired image, the CPU 151 performs a search for an identical region with respect to a plurality of detection-2 areas obtained from the current image. The details of the identical-region search processing are described below.

In step S408, the CPU 151 determines whether an area satisfying a condition has been found out of detection areas of the current image and the subject classification result for the subject of interest has been updated therewith. If it is determined that the subject classification result for the subject of interest has been updated (YES in step S408), the CPU 151 advances the processing to step S410 illustrated in FIG. 5, and, if it is determined that the subject classification result for the subject of interest has not been updated (NO in step S408), the CPU 151 advances the processing to step S409.

In step S409, the CPU 151 performs different-region search processing. Based on the detection-2 area classified into a subject of interest in the past acquired image, the CPU 151 performs a search for a different region with respect to a plurality of detection-1 areas obtained from the current image. The details of the different-region search processing are described below. Next to step S409, the CPU 151 advances the processing to step S410 illustrated in FIG. 5.

In step S410, the CPU 151 determines whether the subject classification result for the subject of interest has already been updated with respect to the detection-1 area and the detection-2 area obtained from the current image. If it is determined that the subject classification result for the subject of interest has already been updated (YES in step S410), the CPU 151 advances the processing to step S411, and, if it is determined that the subject classification result for the subject of interest has not yet been updated (NO in step S410), the CPU 151 advances the processing to step S412.

In step S411, the CPU 151 calculates a region vector and then records the calculated region vector on the RAM 154. The region vector is assumed to be expressed by a two-dimensional vector relative to an image plane. The region vector is able to be obtained by calculating, from coordinates of the detection-1 area and detection-2 area recorded in the subject classification result for the subject of interest, difference values by use of subtraction. The clock time information recorded on the RAM 154 in step S200 illustrated in FIG. 2 is then recorded as recording clock time of the region vector on the RAM 154. Next to step S411, the CPU 151 advances the processing to step S414.

In step S412, the CPU 151 determines whether, in the search processing with respect to the past acquired image, a predetermined period has elapsed from the clock time recorded in step S411. The length of the predetermined period is a threshold time which is set according to the type of a subject targeted for detection. For example, if the type of a subject is a person, "T1" is set as the threshold time, and, if the type of a subject is an animal, "T2" (<T1) is set as the threshold time. If it is determined that the predetermined period has elapsed (YES in step S412), the CPU 151 advances the processing to step S413, and, if it is determined that the predetermined period has not yet elapsed (NO in step S412), the CPU 151 advances the processing to step S414.

In step S413, the CPU 151 deletes data about the region vector recorded on the RAM 154. Then, in step S414, the CPU 151 updates a detection-1 forbidden area with respect to the subject of interest with use of a detection-1 area which has not been used for updating of the subject classification result. The details of update processing are described below. Next to step S414, the CPU 151 advances the processing to step S415.

In step S415, the CPU 151 updates a detection-2 forbidden area with respect to the subject of interest with use of a detection-2 area which has not been used for updating of the subject classification result. The details of update processing are described below. In step S416, the CPU 151 determines whether a subject which has not been selected as a subject of interest in step S401 illustrated in FIG. 4 exists in the subject classification result recorded on the RAM 154 in the past acquired image. If it is determined that the subject concerned exists (YES in step S416), the CPU 151 returns the processing to step S401, thus continuing the processing, and, if it is determined that the subject concerned does not exist (NO in step S416), the CPU 151 ends the search processing.

In the first exemplary embodiment, identical-region search processing, which is high in accuracy, is performed in preference to different-region search processing, which is low in accuracy. In a case where the subject classification result for a subject of interest has been updated with prioritized search processing, the other search processing is not performed, so that it is possible to perform higher-accuracy search processing.

Next, the identical-region search processing (step S403 and step S407 illustrated in FIG. 4) is described in detail with reference to FIG. 6. In step S500, the CPU 151 determines whether a detection area targeted for searching obtained from the current image exists. The detection area targeted for searching is a detection-1 area in the case of step S403 illustrated in FIG. 4 and is a detection-2 area in the case of step S407. If it is determined that the detection area targeted for searching exists (YES in step S500), the CPU 151 advances the processing to step S501, and, if it is determined that the detection area targeted for searching does not exist (NO in step S500), the CPU 151 ends the identical-region search processing.

In step S501, the CPU 151 calculates an identical-region search range. The identical-region search range is obtained as a range of a predetermined magnification (referred to as "$n_1$") of a range which is equal in barycenter to a reference detection area in the past acquired image of the subject of interest and which is indicated by the reference detection area. The value of $n_1$ is set according to the type of a subject targeted for detection. For example, if the type of a subject is a person, the value of $n_1$ is set to $n_{1a}$, and, if the type of a subject is an animal, the value of $n_1$ is set to nib ($>n_{1a}$). Moreover, the reference detection area is a detection-1 area classified into a subject of interest in the past acquired image in the case of step S403 illustrated in FIG. 4 and is a detection-2 area classified into a subject of interest in the past acquired image in the case of step S407.

In step S502, the CPU 151 determines a detection area of interest from a candidate detection area which is in an unused state obtained from the current image. The candidate detection area is a detection-1 area in the case of step S403 illustrated in FIG. 4 and is a detection-2 area in the case of step S407.

In step S503, the CPU 151 determines whether the detection area of interest belongs to a corresponding forbidden area. The corresponding forbidden area is a detection-1 forbidden area in the case of step S403 illustrated in FIG. 4 and is a detection-2 forbidden area in the case of step S407. Whether the detection area of interest belongs to a corresponding forbidden area can be determined based on whether the barycenter of the detection area of interest exists within the corresponding forbidden area. If it is determined that this condition is satisfied (YES in step S503), the CPU 151 returns the processing to step S502, and, if it is determined that this condition is not satisfied (NO in step S503), the CPU 151 advances the processing to step S504.

In step S504, the CPU 151 determines whether the detection area of interest is included in the identical-region search range. If it is determined that this condition is satisfied (YES in step S504), the CPU 151 advances the processing to step S505, and, if it is determined that this condition is not satisfied (NO in step S504), the CPU 151 advances the processing to step S510.

In step S505, the CPU 151 updates a classification result of the subject of interest with the detection area of interest, and, in step S506, the CPU 151 changes the detection area of interest into a used state. In step S507, the CPU 151 determines whether a detection result associated with the detection area of interest in step S207 illustrated in FIG. 2 is present. If it is determined that the detection result is present (YES in step S507), the CPU 151 advances the processing to step S508, and, if it is determined that the detection result is not present (NO in step S507), the CPU 151 advances the processing to step S510.

In step S508, the CPU 151 updates a classification result of the subject of interest with the associated detection area, and, in step S509, the CPU 151 changes the associated detection result into a used state. In step S510, the CPU 151 determines whether an unprocessed area, which has not been selected as a detection area of interest, is present out of detection areas targeted for searching. If it is determined that the unprocessed area is present (YES in step S510), the CPU 151 returns the processing to step S502, thus repeating a series of processing operations, and, if it is determined that the unprocessed area is not present (NO in step S510), the CPU 151 ends the identical-region search processing.

Figure 7:
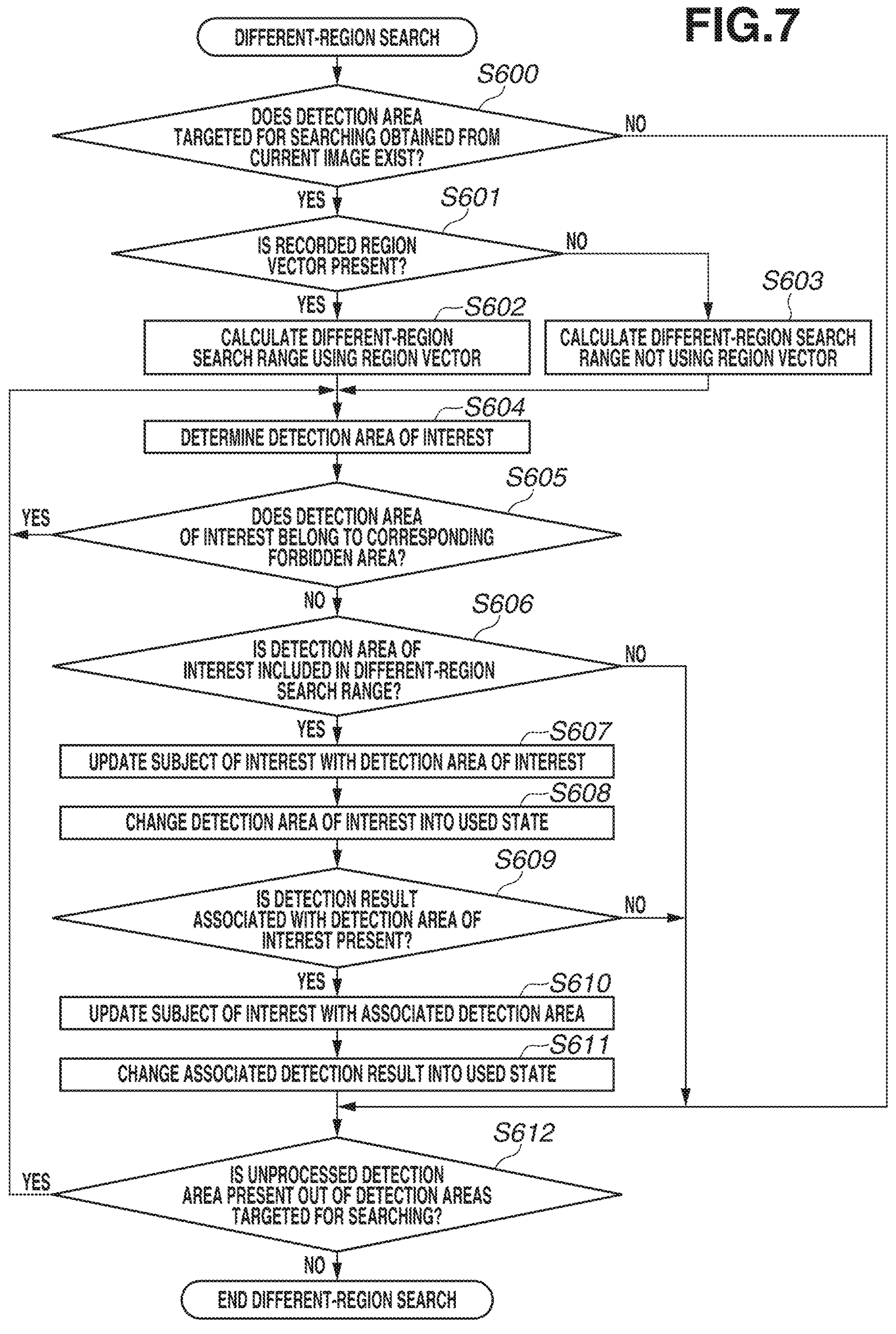
FIG. 7 is a flowchart of different-region search processing in the first exemplary embodiment.

Next, the different-region search processing (step S405 and step S409 illustrated in FIG. 4) is described in detail with reference to FIG. 7. In step S600, the CPU 151 determines whether a detection area targeted for searching obtained from the current image exists. The detection area targeted for searching is a detection-2 area in the case of step S405 illustrated in FIG. 4 and is a detection-1 area in the case of step S409. If it is determined that the detection area targeted for searching exists (YES in step S600), the CPU 151 advances the processing to step S601, and, if it is determined that the detection area targeted for searching does not exist (NO in step S600), the CPU 151 ends the different-region search processing.

In step S601, the CPU 151 determines whether a region vector recorded on the RAM 154 with respect to the subject of interest is present. If it is determined that the region vector is currently recorded (YES in step S601), the CPU 151 advances the processing to step S602, and, if it is determined that the region vector is not currently recorded (NO in step S601), the CPU 151 advances the processing to step S603.

In step S602, the CPU 151 calculates a different-region search range using a region vector. The barycenter of the different-region search range in the present step is obtained by adding or subtracting a region vector to or from a reference detection area in the past acquired image of the subject of interest. Moreover, the different-region search range is obtained as a range obtained by multiplying the range of the reference detection area in the past acquired image of the subject of interest by a predetermined magnification (referred to as "$n_2$"). The value of $n_2$ is set according to the type of a subject targeted for detection. For example, if the type of a subject is a person, the value of $n_2$ is set to $n_{2a}$, and, if the type of a subject is an animal, the value of $n_2$ is set to $n_{2b}$ ($>n_{2a}$). The reference detection area is a detection-1 area included in the subject classification result of the subject of interest in the case of step S405 illustrated in FIG. 4 and is a detection-2 area included in the subject classification result of the subject of interest in the case of step S409.

In step S603, the CPU 151 calculates a different-region search range not using a region vector.

The different-region search range in the present step is obtained as a range which is equal in barycenter to a reference detection area in the past acquired image of the subject of interest and which is obtained by multiplying the range of the reference detection area by a predetermined magnification (referred to as "$n_3$"). The value of $n_3$ is set according to the type of a subject targeted for detection, and "$n_3>n_2$" is assumed to be set. For example, if the type of a subject is a person, the value of $n_3$ is set to $n_{3a}$, and, if the type of a subject is an animal, the value of $n_3$ is set to $n_{3b}$ ($>n_{3a}$). The reference detection area is the same as that described in the case of step S602.

In step S604, the CPU 151 determines a detection area of interest from a candidate detection area which is in an unused state obtained from the current image. The candidate detection area is a detection-2 area in the case of step S405 illustrated in FIG. 4 and is a detection-1 area in the case of step S409.

In step S605, the CPU 151 determines whether the detection area of interest belongs to a corresponding forbidden area. The corresponding forbidden area is a detection-2 forbidden area in the case of step S405 illustrated in FIG. 4 and is a detection-1 forbidden area in the case of step S409. Whether the detection area of interest belongs to a corresponding forbidden area can be determined based on whether the barycenter of the detection area of interest exists within the corresponding forbidden area. If it is determined that the condition in step S605 is satisfied (YES in step S605), the CPU 151 returns the processing to step S604, and, if it is determined that the condition in step S605 is not satisfied (NO in step S605), the CPU 151 advances the processing to step S606. Processing operations in step S606 to step S612 are similar to the respective processing operations in step S504 to step S510 illustrated in FIG. 6 and are, therefore, omitted from description.

Figure 8A:
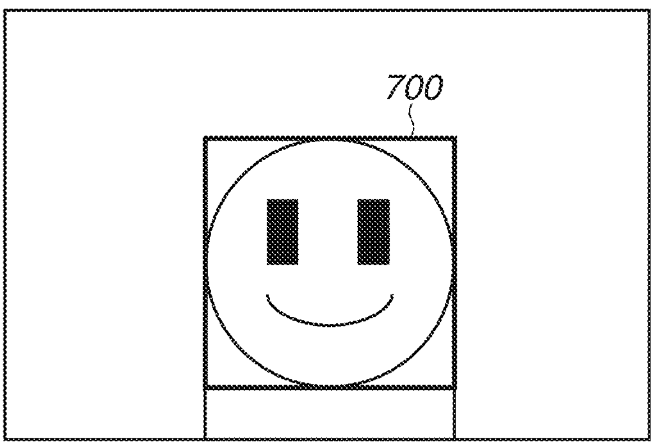
FIGS. 8A and 8B are schematic diagrams of examples of identical-region search in the first exemplary embodiment.
Figure 8B:
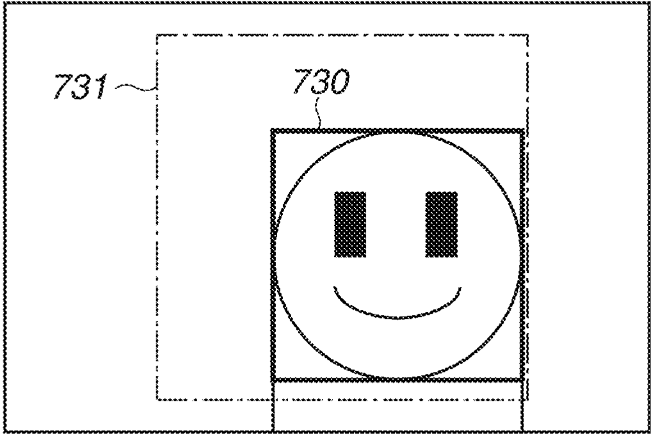
Figure 9A:
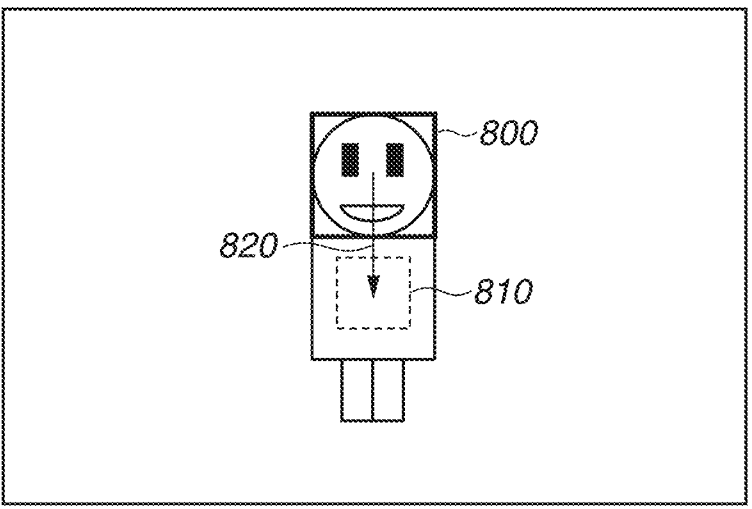
FIGS. 9A and 9B are schematic diagrams of examples of different-region search which uses a region vector in the first exemplary embodiment.
Figure 9B:
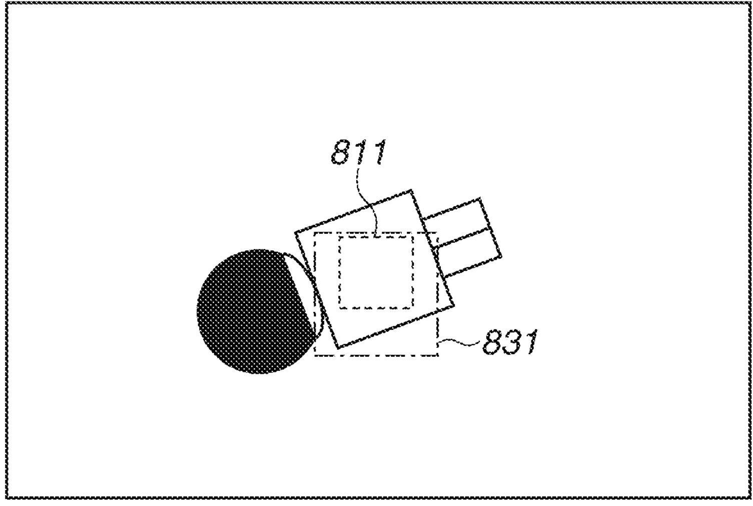
Figure 10A:
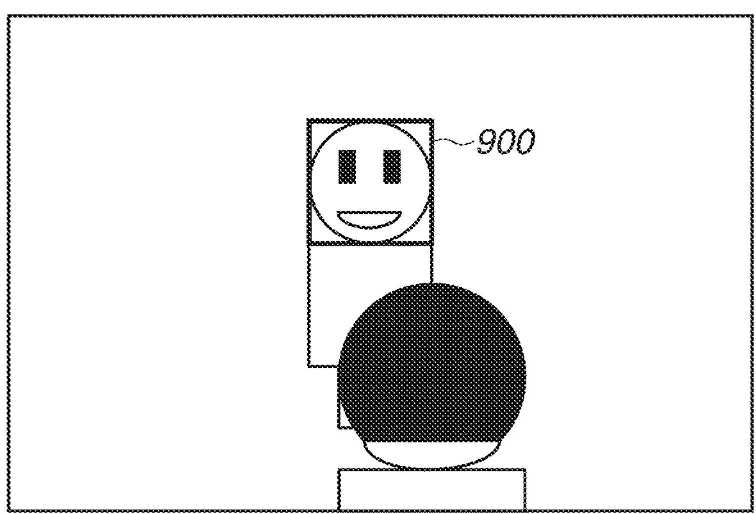
FIGS. 10A and 10B are schematic diagrams of examples of different-region search which does not use a region vector in the first exemplary embodiment.
Figure 10B:
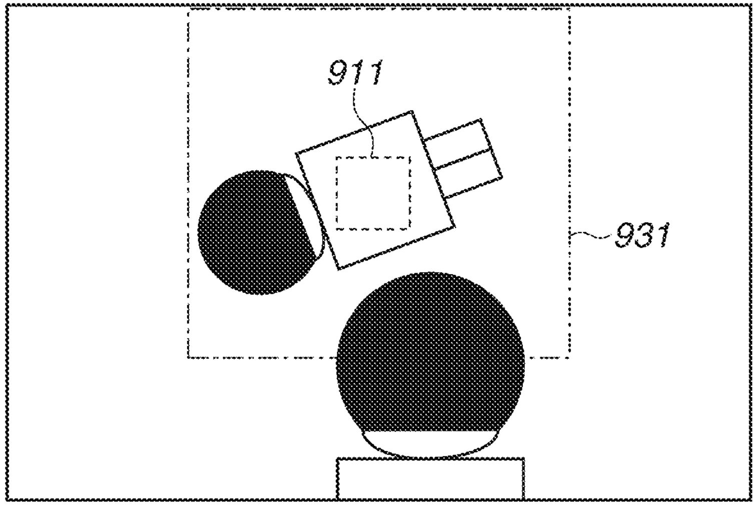

The search processing in the first exemplary embodiment is specifically described with reference to FIGS. 8A and 8B to FIGS. 10A to 10B. In FIGS. 8A and 8B to FIGS. 10A to 10B, each of FIGS. 8A, 9A, and 10A illustrates the past acquired image, and each of FIGS. 8B, 9B, and 10B illustrates the current image. In the past acquired image illustrated in FIG. 8A, a detection-1 area 700 is acquired with respect to a subject. In this case, an identical-region search range 731 is calculated in step S501 illustrated in FIG. 6 with respect to the current image illustrated in FIG. 8B. The subject classification result of the subject of interest is updated with use of a detection-1 area 730 satisfying a condition within the identical-region search range 731.

FIGS. 9A and 9B are schematic diagrams illustrating an example of different-region search using a region vector. In the past acquired image illustrated in FIG. 9A, a detection-1 area 800 and a detection-2 area 810 are acquired with respect to a subject, and a region vector 820 is recorded in step S411 illustrated in FIG. 5. In this case, a different-region search range 831 is calculated in step S602 illustrated in FIG. 7 with respect to the current image illustrated in FIG. 9B. The subject classification result of the subject of interest is updated with use of a detection-2 area 811 satisfying a condition within the different-region search range 831.

FIGS. 10A and 10B are schematic diagrams illustrating an example of different-region search not using a region vector. In the past acquired image illustrated in FIG. 10A, a detection-1 area 900 is acquired with respect to a subject. In this case, a different-region search range 931 is calculated in step S603 illustrated in FIG. 7 with respect to the current image illustrated in FIG. 10B.

The subject classification result of the subject of interest is updated with use of a detection-2 area 911 satisfying a condition within the different-region search range 931.

The forbidden area update processing (step S414 and step S415 illustrated in FIG. 5) in the first exemplary embodiment is described in detail with reference to FIG. 11. In step S1000, the CPU 151 determines whether a forbidden area targeted for updating in the past acquired image is currently recorded. The forbidden area targeted for updating is a detection-1 forbidden area in the case of step S414 illustrated in FIG. 5 and is a detection-2 forbidden area in the case of step S415. If it is determined that the forbidden area targeted for updating is currently recorded (YES in step S1000), the CPU 151 advances the processing to step S1001, and, if it is determined that the forbidden area targeted for updating is not currently recorded (NO in step S1000), the CPU 151 advances the processing to step S1009.

In step S1001, the CPU 151 sets a forbidden area of interest out of forbidden areas targeted for updating. In step S1002, the CPU 151 refers to the motion vector map acquired in step S205 illustrated in FIG. 2 and performs a condition determination as to whether a motion vector larger than a predetermined value (threshold value) exists in an area corresponding to the forbidden area of interest. If it is determined that a motion vector satisfying the condition exists (YES in step S1002), the CPU 151 advances the processing to step S1007, and, if it is determined that a motion vector satisfying the condition does not exist (NO in step S1002), the CPU 151 advances the processing to step S1003.

In step S1003, the CPU 151 compares a defocus map acquired in step S206 illustrated in FIG. 2 in the past acquired image with a defocus map acquired in step S206 illustrated in FIG. 2 in the current image. Thus, processing for determining whether a distance difference larger than a predetermined value exists in an area corresponding to the forbidden area of interest is performed. If it is determined that a distance difference satisfying the condition exists (YES in step S1003), the CPU 151 advances the processing to step S1007, and, if it is determined that a distance difference satisfying the condition does not exist (NO in step S1003), the CPU 151 advances the processing to step S1004.

In step S1004, the CPU 151 determines whether a detection area belonging to the forbidden area of interest exists within the target detection area obtained from the current image. If it is determined that the detection area concerned exists (YES in step S1004), the CPU 151 advances the processing to step S1005, and, if it is determined that the detection area concerned does not exist (NO in step S1004), the CPU 151 advances the processing to step S1007. However, the target detection area is limited to a detection-1 area which is not used for updating of the subject classification result of the subject of interest in step S414 illustrated in FIG. 5 and which is not brought into a registered state in step S1006. Moreover, the target detection area is limited to a detection-2 area which is not used for updating of the subject classification result of the subject of interest in step S415 illustrated in FIG. 5 and which is not brought into a registered state in step S1006.

In step S1005, the CPU 151 updates the forbidden area of interest recorded on the RAM 154.

The area to be updated is assumed to be an area which is based on the detection area determined to exist in step S1004 and which has been processed in such a way as to cancel the position or orientation change amount obtained in step S204 illustrated in FIG. 2. Next to step S1005, the CPU 151 advances the processing to step S1006.

In step S1006, the CPU 151 updates the detection area used for updating in step S1005 into a registered state. In step S1007, the CPU 151 deletes the forbidden area of interest recorded on the RAM 154. Next to step S1006 or step S1007, the CPU 151 advances the processing to step S1008.

In step S1008, the CPU 151 performs a condition determination as to whether an area which is a target for updating and which is not set as the forbidden area of interest in step S1001 exists. If it is determined that this condition is satisfied (YES in step S1008), the CPU 151 returns the processing to step S1001, thus continuing the processing, and, if it is determined that this condition is not satisfied (NO in step S1008), the CPU 151 advances the processing to step S1009.

In step S1009, the CPU 151 performs a condition determination as to whether a target detection area which is not brought into a registered state (which is in an unregistered state) in step S1006 exists. If it is determined that this condition is satisfied (YES in step S1009), the CPU 151 advances the processing to step S1010, and, if it is determined that this condition is not satisfied (NO in step S1009), the CPU 151 ends the forbidden area update processing.

In step S1010, the CPU 151 newly adds all of the detection areas determined to exist in step S1009 (being in an unregistered state) as forbidden areas for the subject of interest to the RAM 154. Then, the CPU 151 ends a series of processing operations.

An example of deletion of a forbidden area in the first exemplary embodiment is specifically described with reference to FIGS. 12A, 12B, 12C, 12D, 12E, 12F, and 12G. FIG. 12A illustrates a detection state in the past acquired image. Face areas 1100 and 1102 and torso areas 1110 and 1111 for the respective subjects are currently detected. The subject of the face area 1100 is in a state in which a part of the torso thereof is hidden by the subject of the torso area 1110, which is situated at the front side (the side closer to the image capturing apparatus).

FIG. 12B illustrates a detection state in the current image. Face areas 1120 and 1121 and torso areas 1130 and 1131 for the respective subjects are currently detected. Parts of the face area and torso area of a subject situated behind the subject of the face area 1120 are in the state of being hidden by the subject of the face area 1120. FIG. 12C illustrates a motion vector map corresponding to the current image. Data about directions and magnitudes of vectors are recorded with respect to the respective coordinates.

FIG. 12D illustrates a distance map corresponding to the past acquired image. FIG. 12E illustrates a distance map corresponding to the current image. Each distance map is expressed in such a manner that, as the lightness is higher, an area is situated at the more front side (closer to the image capturing apparatus).

FIG. 12F illustrates a table showing forbidden areas in a case where a subject C situated at the most front side in the past acquired image is a forbidden area of interest. The face areas 1100 and 1102 are detection-1 forbidden areas, and the torso area 1111 is a detection-2 forbidden area. FIG. 12G illustrates a table showing a subject classification result in the current image. For example, with regard to a subject with a subject ID of C, the face area 1120 is a detection-1 area and the torso area 1130 is a detection-2 area.

As illustrated in FIG. 12C, in the face area 1100, which is registered as a forbidden area, motion vectors the magnitude of which is greater than or equal to a predetermined value are calculated in the current image. Accordingly, the face area 1100 satisfies a forbidden area deletion condition which is determined in step S1002 illustrated in FIG. 11. Moreover, as illustrated in FIGS. 12D to 12F, in the face area 1100, which is registered as a forbidden area, distance information is varying in the current image. Accordingly, the face area 1100 satisfies a forbidden area deletion condition which is determined in step S1003 illustrated in FIG. 11.

Performing deletion of a forbidden area according to the above-described condition determination enables preventing or reducing the occurrence of an issue in which, in a case where the detection result of a subject of interest has appeared in a forbidden area, a subject classification result of the subject of interest is not updated in the search processing.

Figure 13:
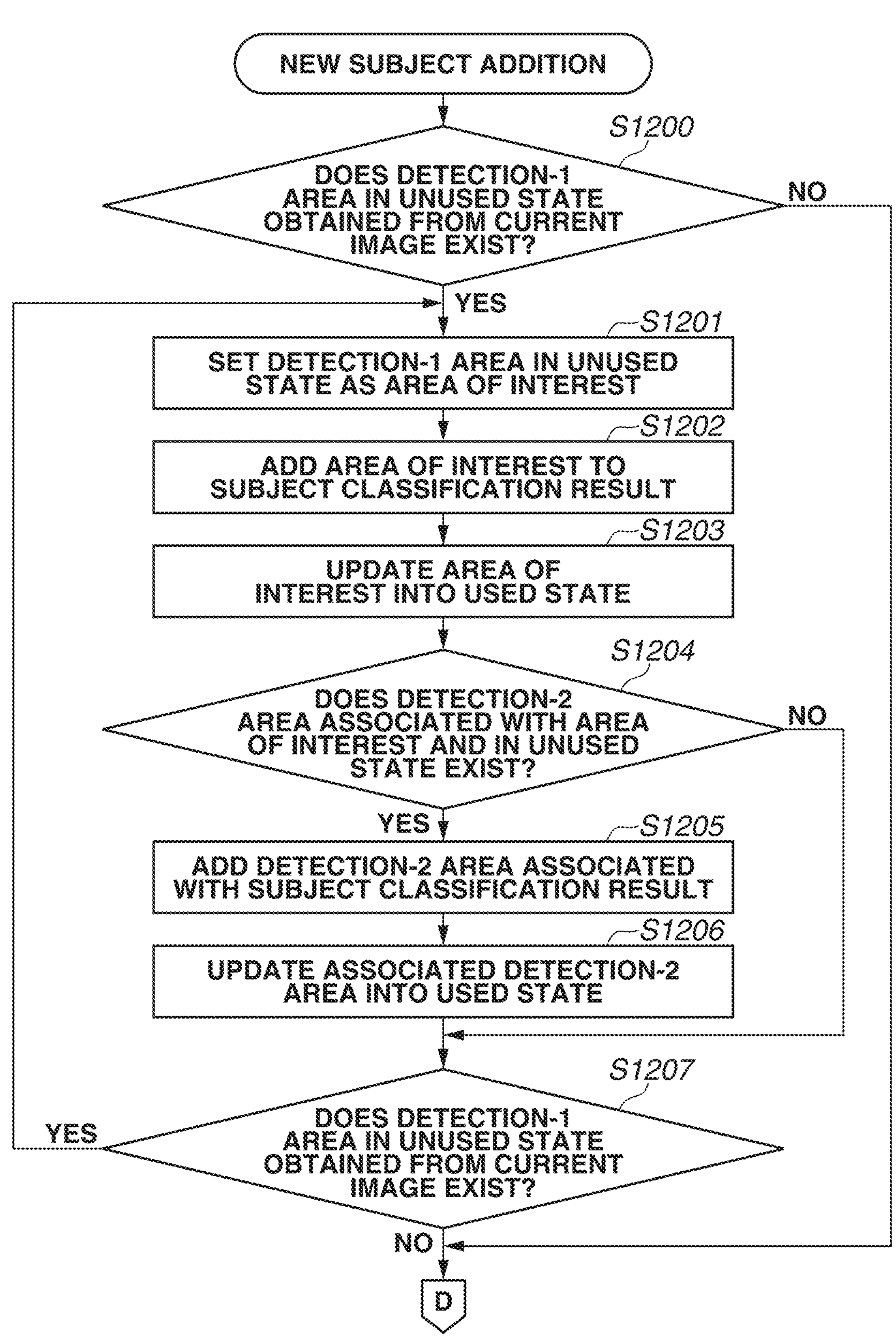
FIG. 13 is a flowchart of new-subject addition processing in the first exemplary embodiment.
Figure 14:
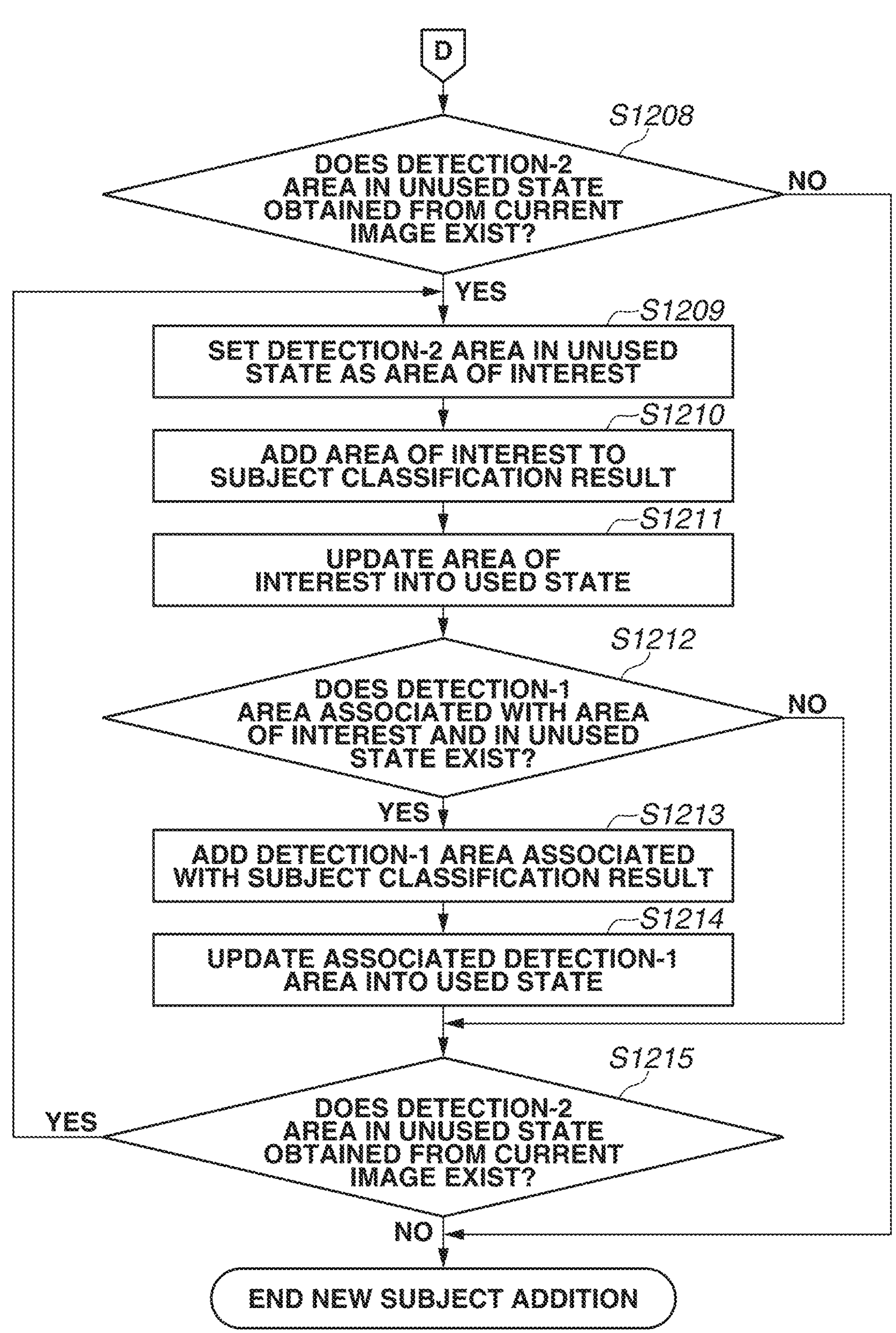
FIG. 14 is a flowchart of processing following the processing illustrated in FIG. 13.

The new subject addition processing (step S211 illustrated in FIG. 2) is described in detail with reference to FIG. 13 and FIG. 14. In step S1200, the CPU 151 determines whether an area which is in an unused state exists out of detection-1 areas obtained from the current image. If it is determined that a detection-1 area which is in an unused state exists (YES in step S1200), the CPU 151 advances the processing to step S1201, and, if it is determined that a detection-1 area which is in an unused state does not exist (NO in step S1200), the CPU 151 advances the processing to step S1208 illustrated in FIG. 14.

In step S1201, the CPU 151 sets the detection-1 area which is in an unused state as an area of interest. In step S1202, the CPU 151 assigns a new subject ID to the area of interest, adds the area of interest with the new subject ID assigned thereto to the subject classification result, and records the subject classification result with the area of interest added thereto on the RAM 154. In step S1203, the CPU 151 updates the area of interest into a used state, and records the updated area of interest on the RAM 154.

In step S1204, the CPU 151 performs a condition determination as to whether a detection-2 area which is associated with the area of interest in step S207 illustrated in FIG. 2 and which is in an unused state exists. If it is determined that this condition is satisfied (YES in step S1204), the CPU 151 advances the processing to step S1205, and, if it is determined that this condition is not satisfied (NO in step S1204), the CPU 151 advances the processing to step S1207.

In step S1205, the CPU 151 assigns the same subject ID as the subject ID assigned in step S1202 to the detection-2 area associated with the area of interest, adds the detection-2 area to the subject classification result, and records the subject classification result with the detection-2 area added thereto on the RAM 154. In step S1206, the CPU 151 updates the detection-2 area associated with the area of interest into a used state, and records the updated detection-2 area on the RAM 154.

In step S1207, the CPU 151 performs a condition determination as to whether an area which is in an unused state exists out of detection-1 areas obtained from the current image. If it is determined that this condition is satisfied (YES in step S1207), the CPU 151 returns the processing to step S1201, thus continuing the processing, and, if it is determined that this condition is not satisfied (NO in step S1207), the CPU 151 advances the processing to step S1208 illustrated in FIG. 14.

In step S1208, the CPU 151 performs a condition determination as to whether an area which is in an unused state exists out of detection-2 areas obtained from the current image. If it is determined that this condition is satisfied (YES in step S1208), the CPU 151 advances the processing to step S1209, and, if it is determined that this condition is not satisfied (NO in step S1208), the CPU 151 ends the new subject addition processing.

In step S1209, the CPU 151 sets the detection-2 area which is in an unused state as an area of interest. In step S1210, the CPU 151 assigns a new subject ID to the area of interest, adds the area of interest with the new subject ID assigned thereto to the subject classification result, and records the subject classification result with the area of interest added thereto on the RAM 154. In step S1211, the CPU 151 updates the area of interest into a used state, and records the updated area of interest on the RAM 154.

In step S1212, the CPU 151 performs a condition determination as to whether a detection-1 area which is associated with the area of interest in step S207 illustrated in FIG. 2 and which is in an unused state exists. If it is determined that this condition is satisfied (YES in step S1212), the CPU 151 advances the processing to step S1213, and, if it is determined that this condition is not satisfied (NO in step S1212), the CPU 151 advances the processing to step S1215.

In step S1213, the CPU 151 assigns the same subject ID as the subject ID assigned in step S1210 to the detection-1 area associated with the area of interest, adds the detection-1 area to the subject classification result, and records the subject classification result with the detection-1 area added thereto on the RAM 154. In step S1214, the CPU 151 updates the detection-1 area associated with the area of interest into a used state, and records the updated detection-1 area on the RAM 154.

In step S1215, the CPU 151 performs a condition determination as to whether an area which is in an unused state exists out of detection-2 areas obtained from the current image. If it is determined that this condition is satisfied (YES in step S1215), the CPU 151 returns the processing to step S1209, thus continuing the processing, and, if it is determined that this condition is not satisfied (NO in step S1215), the CPU 151 ends the new subject addition processing.

According to the first exemplary embodiment, it is possible to, while preventing or reducing an error due to different-region search, increase the success rate of subject detection in successive frames to continue searching.

While, in the first exemplary embodiment, an example in which, in a case where an applicable region has been detected in identical-region search, different-region search is not performed has been described, the first exemplary embodiment is not limited to this. Even in a case where the CPU 151 performs both identical-region search and different-region search in parallel or in sequence and regions corresponding to (estimated to correspond to) the same subject have been detected from both identical-region search and different-region search, the CPU 151 can prioritize a result obtained in identical-region search and detect a subject corresponding to a result of identical-region search as a subject of interest serving as a target for tracking or a target for frame display.

Next, a second exemplary embodiment of the present disclosure is described. In the second exemplary embodiment, particulars similar to those in the first exemplary embodiment are omitted from description, and differences between the first exemplary embodiment and the second exemplary embodiment are mainly described. Such a method of omission of description is also applied to subsequent exemplary embodiments described below. In the second exemplary embodiment, the region detection unit 161 is assumed to be able to detect the face area of a person and the torso area of a person. The detection-1 area is assumed to be the face area and the detection-2 area is assumed to be the torso area. Moreover, the face area, in which the operator is highly interested, is assumed to be higher in importance than the torso area.

Figure 15:
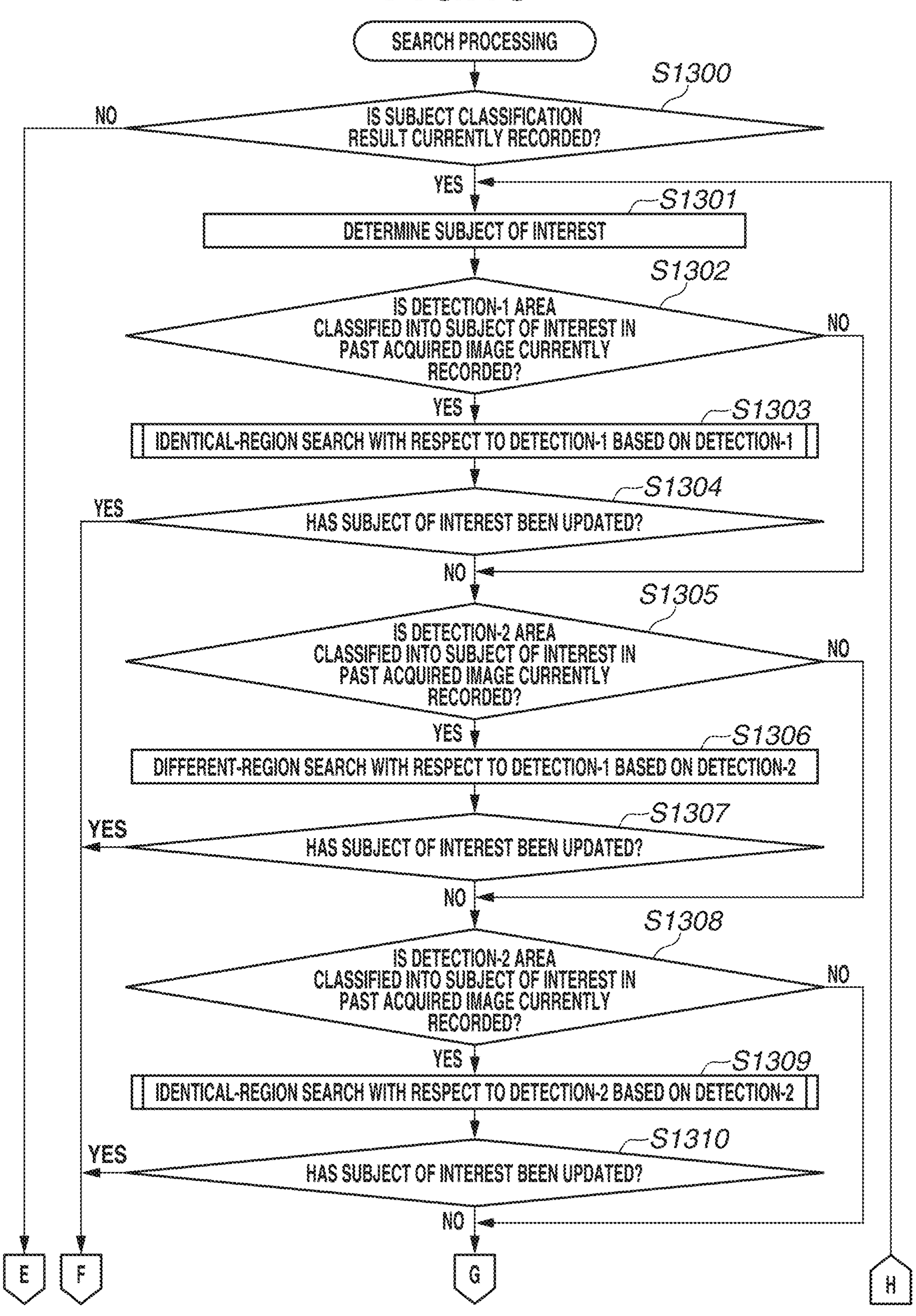
FIG. 15 is a flowchart of search processing in a second exemplary embodiment and a third exemplary embodiment.

Search processing (step S209 illustrated in FIG. 2) in the second exemplary embodiment is described in detail with reference to FIG. 15 and FIG. 16. In step S1300 illustrated in FIG. 15, the CPU 151 determines whether a subject classification result is currently recorded on the RAM 154 with regard to search processing for the past acquired image. If it is determined that the subject classification result is currently recorded on the RAM 154 (YES in step S1300), the CPU 151 advances the processing to step S1301, and, if it is determined that the subject classification result is not currently recorded on the RAM 154 (NO in step S1300), the CPU 151 ends the search processing.

In step S1301, the CPU 151 determines a subject of interest from subject classification results recorded on the RAM 154. In a case where a plurality of candidates for a subject of interest exists, processing for prioritizing a subject which is highest in the subject priority degree calculated in step S211 illustrated in FIG. 2 is performed.

In step S1302, the CPU 151 determines whether a detection-1 area classified into a subject of interest in the past acquired image is currently recorded on the RAM 154. If it is determined that the detection-1 area is currently recorded (YES in step S1302), the CPU 151 advances the processing to step S1303, and, if it is determined that the detection-1 area is not currently recorded (NO in step S1302), the CPU 151 advances the processing to step S1305.

In step S1303, the CPU 151 performs identical-region search processing with respect to a plurality of detection-1 areas obtained from the current image, based on the detection-1 area classified into a subject of interest in the past acquired image. In step S1304, the CPU 151 performs a condition determination as to whether a subject satisfying a condition has been found out of detection areas of the current image with respect to the subject of interest and the subject classification result has already been updated therewith. If it is determined that this condition is satisfied (YES in step S1304), the CPU 151 advances the processing to step S1313 illustrated in FIG. 16, and, if it is determined that this condition is not satisfied (NO in step S1304), the CPU 151 advances the processing to step S1305.

In step S1305, the CPU 151 determines whether a detection-2 area classified into a subject of interest in the past acquired image is currently recorded on the RAM 154. If it is determined that the detection-2 area is currently recorded (YES in step S1305), the CPU 151 advances the processing to step S1306, and, if it is determined that the detection-2 area is not currently recorded (NO in step S1305), the CPU 151 advances the processing to step S1308.

In step S1306, the CPU 151 performs different-region search processing with respect to a plurality of detection-1 areas obtained from the current image, based on the detection-2 area classified into a subject of interest in the past acquired image. In step S1307, the CPU 151 performs a condition determination as to whether a subject satisfying a condition has been found out of detection areas of the current image with respect to the subject of interest and the subject classification result has already been updated therewith. If it is determined that this condition is satisfied (YES in step S1307), the CPU 151 advances the processing to step S1313 illustrated in FIG. 16, and, if it is determined that this condition is not satisfied (NO in step S1307), the CPU 151 advances the processing to step S1308.

In step S1308, the CPU 151 performs a condition determination as to whether a detection-2 area classified into a subject of interest in the past acquired image is currently recorded on the RAM 154. If it is determined that this condition is satisfied (YES in step S1308), the CPU 151 advances the processing to step S1309, and, if it is determined that this condition is not satisfied (NO in step S1308), the CPU 151 advances the processing to step S1311 illustrated in FIG. 16.

In step S1309, the CPU 151 performs identical-region search processing with respect to a plurality of detection-2 areas obtained from the current image, based on the detection-2 area classified into a subject of interest in the past acquired image. In step S1310, the CPU 151 performs a condition determination as to whether a subject satisfying a condition has been found out of detection areas of the current image with respect to the subject of interest and the subject classification result has already been updated therewith. If it is determined that this condition is satisfied (YES in step S1310), the CPU 151 advances the processing to step S1313 illustrated in FIG. 16, and, if it is determined that this condition is not satisfied (NO in step S1310), the CPU 151 advances the processing to step S1311 illustrated in FIG. 16.

Figure 16:
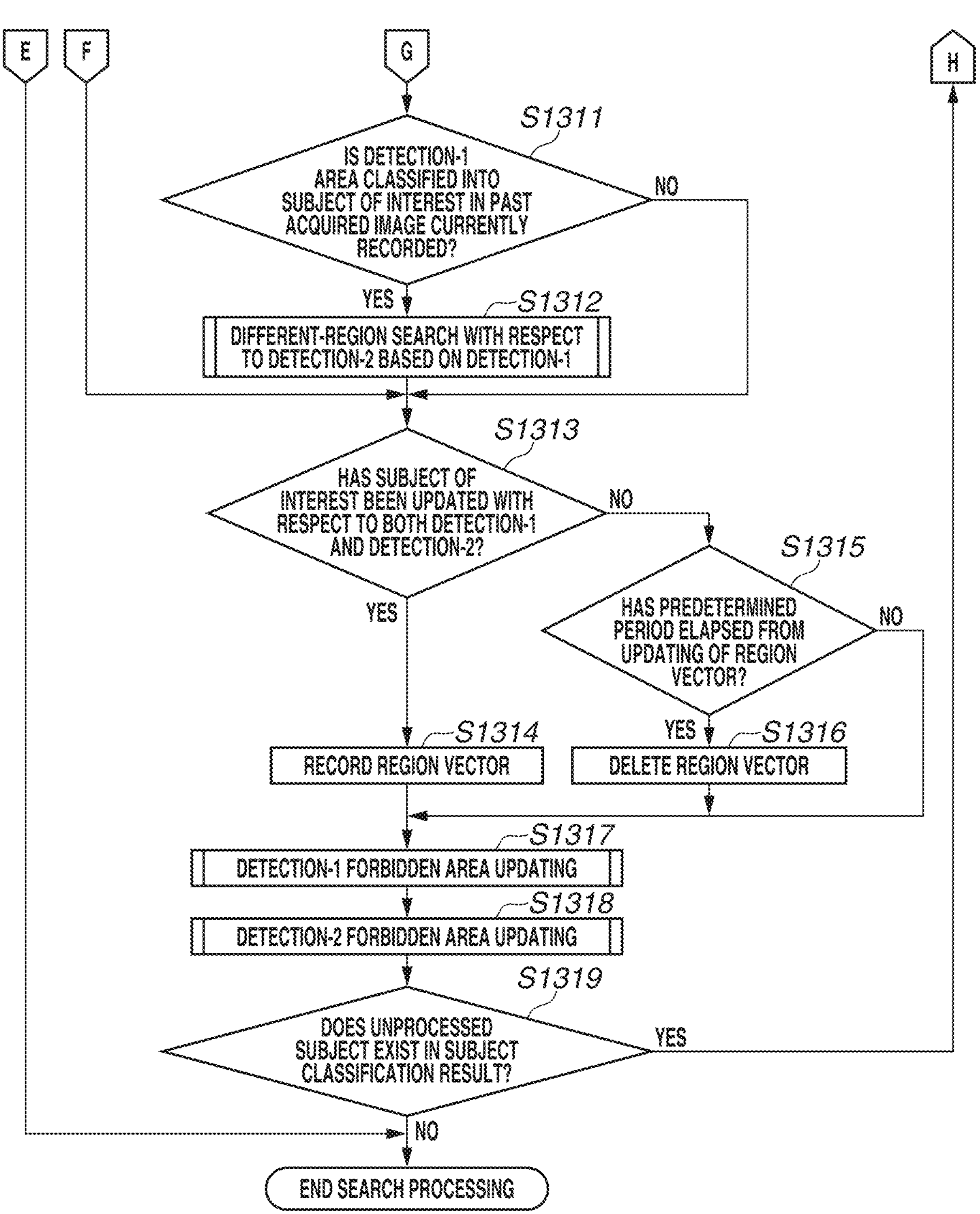
FIG. 16 is a flowchart of processing following the processing illustrated in FIG. 15.

In step S1311 illustrated in FIG. 16, the CPU 151 performs a condition determination as to whether a detection-1 area classified into a subject of interest in the past acquired image is currently recorded on the RAM 154. If it is determined that this condition is satisfied (YES in step S1311), the CPU 151 advances the processing to step S1312, and, if it is determined that this condition is not satisfied (NO in step S1311), the CPU 151 advances the processing to step S1313. In step S1312, the CPU 151 performs different-region search processing with respect to a plurality of detection-2 areas obtained from the current image, based on the detection-1 area classified into a subject of interest in the past acquired image.

Figure 5:
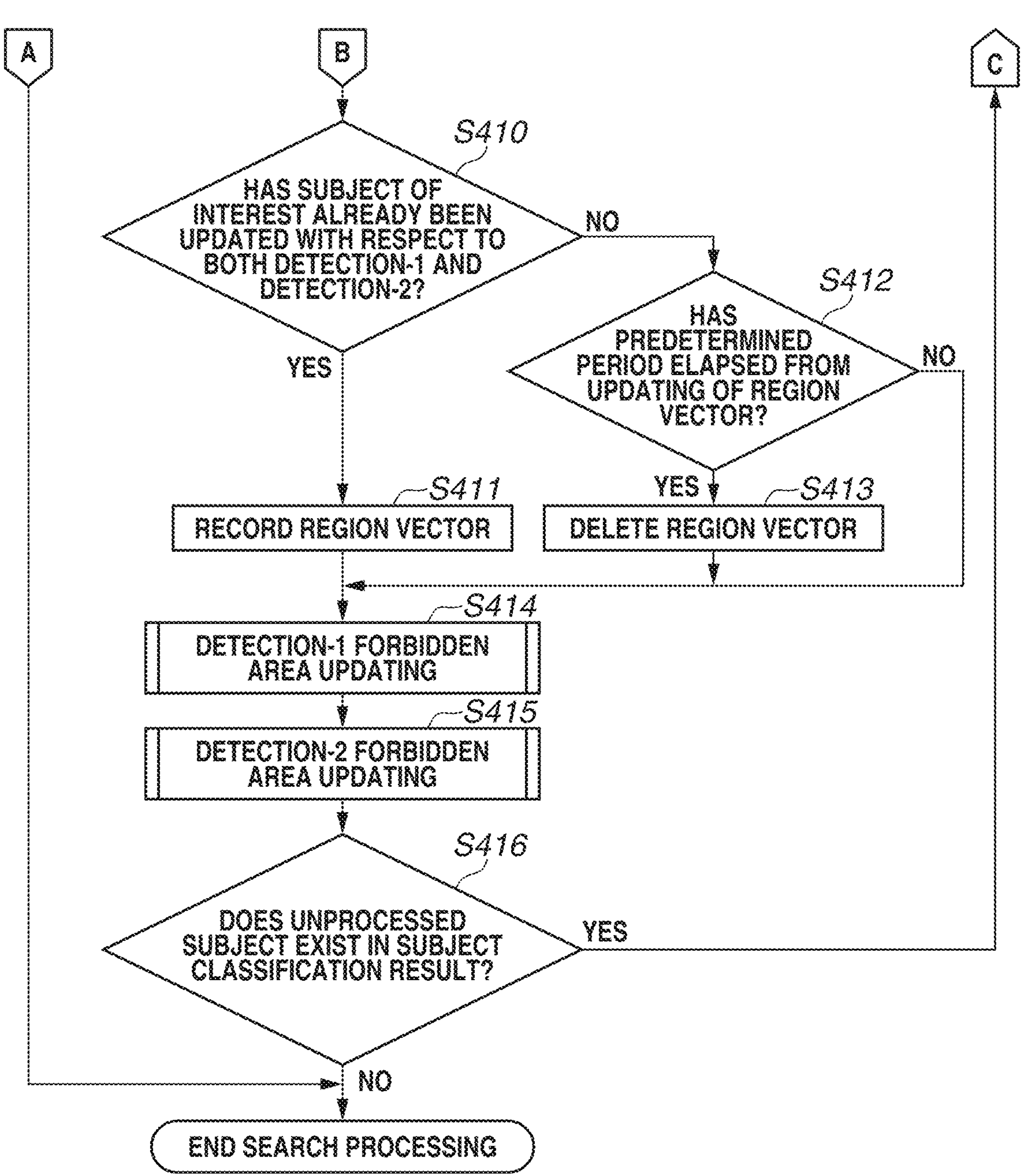
FIG. 5 is a flowchart of processing following the processing illustrated in FIG. 4.

Processing operations in step S1313 to step S1319 are similar to the respective processing operations in step S410 to step S416 illustrated in FIG. 5 described in the first exemplary embodiment and are, therefore, omitted from description. Identical-region search processing, different-region search processing, forbidden-area update processing, and new-subject addition processing in the second exemplary embodiment are similar to those in the first exemplary embodiment.

In the second exemplary embodiment, identical-region search processing, which is high in accuracy, is performed in preference to different-region search processing, which is low in accuracy. In a case where the subject of interest has been updated by the prioritized search processing, not performing the other search processing enables performing high-accuracy search processing. Moreover, with regard to identical-region search processing, since processing in step S1306 illustrated in FIG. 15 is performed in preference to processing in step S1309, it is possible to increase the probability of information about the subject of interest being updated in a detection area high in importance. According to the second exemplary embodiment, it is possible to, while preventing or reducing an error due to different-region search and prioritizing an area high in importance, increase the success rate of subject detection in successive frames to continue searching.

Next, with regard to a third exemplary embodiment of the present disclosure, differences from the second exemplary embodiment are described. The region detection unit 161 in the third exemplary embodiment is assumed to be able to detect the whole body area of a person and the eye area of a person. The detection-1 area is assumed to be the whole body area, and the detection-2 area is assumed to be the eye area. Moreover, since the whole body size of a person is sufficiently larger than the eye size of a person, the whole body area is assumed to be higher in importance. Alternatively, the whole body area of a person internally includes the eye area of the person and is, therefore, assumed to be higher in importance. Furthermore, search processing in the third exemplary embodiment is similar to that in the second exemplary embodiment, so that, for example, identical-region search processing, different-region search processing, forbidden-area update processing, and new-subject addition processing are omitted from description.

In the third exemplary embodiment, it is possible to perform high-accuracy search processing as with the second exemplary embodiment. Moreover, since processing in step S1306 illustrated in FIG. 15 is performed in preference to processing in step S1309, it is possible to prevent or reduce an error of search due to a local area (small-sized area). According to the third exemplary embodiment, it is possible to, while preventing or reducing an error due to different-region search and preventing or reducing an error due to a local area, increase the success rate of subject detection in successive frames to continue searching.

The present disclosure can also be implemented by performing processing for supplying a program which implements one or more functions of the above-described exemplary embodiments to a system or apparatus via a network or a storage medium and causing one or more processors in a computer of the system or apparatus to read out and execute the program. Moreover, the present disclosure can also be implemented by a circuit which implements the above-mentioned one or more functions (for example, an application specific integrated circuit (ASIC)).

According to an image processing apparatus in aspects of the present disclosure, it is possible to classify detection results of a plurality of regions according to subject with a higher degree of accuracy.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-007909 filed Jan. 21, 2022, which is hereby incorporated by reference herein in its entirety.

What is claimed is:

1. An image processing apparatus comprising:

one or more processors; and a memory storing instructions which, when the instructions are executed by the one or more processors, cause the image processing apparatus to function as units comprising:

a detection unit configured to detect a plurality of regions of a subject from each of a first image and a second image to output a detection result;

a determination unit configured to determine a degree of reliability of detection of a region detected by the detection unit; and a search unit configured to search for a detection result detected from the second image corresponding to a detection result detected from the first image, wherein the search unit performs, with use of detection results the degree of reliability of each of which is greater than a threshold value from among detection results of regions detected by the detection unit, different-region search, which searches for detection results of different regions between the first image and the second image, and identical-region search, which searches for detection results of an identical region between the first image and the second image, and performs the identical-region search in preference to the different-region search, wherein, in a case where, in the first image, there are detection results classified into a plurality of subjects, the search unit performs search processing for each plurality of subjects in the second image, and wherein the search unit does not use a detection result classified into a first subject in detection results obtained from the second image, for search processing for a second subject.

2. The image processing apparatus according to claim 1, wherein the detection unit performs first detection, which detects a first region of a subject from each of the first image and the second image, and second detection, which detects a second region of a subject from each of the first image and the second image, and wherein, in a case where a degree of importance of a detection result obtained by the first detection is higher than a degree of importance of a detection result obtained by the second detection, the search unit prioritizes a search using the detection result obtained by the first detection.

3. The image processing apparatus according to claim 2, wherein the detection unit detects a face area of a subject by the first detection and detects a torso area of a subject by the second detection, or the detection unit detects a whole body area of a subject by the first detection and detects an eye area of a subject by the second detection.

4. The image processing apparatus according to claim 2, wherein the search unit prioritizes a search using a detection result of a region large in size over a search using a detection result of a region small in size.

5. The image processing apparatus according to claim 2, wherein, in a case where the first region includes the second region, the search unit prioritizes a search using a detection result of the first region.

6. The image processing apparatus according to claim 2, further comprising:

a labeling processing unit configured to acquire a label map for each subject with respect to an acquired image; and an association processing unit configured to perform association between a detection area obtained by the first detection and a detection area obtained by the second detection with use of the label map.

7. The image processing apparatus according to claim 6, wherein, in a case where, in a plurality of detection results obtained from the second image, there are detection results and which are associated with each other by the association processing unit, the search unit performs processing for classifying the plurality of detection results according to subject.

8. The image processing apparatus according to claim 1, further comprising a calculation unit configured to calculate a degree of priority of a subject with respect to a plurality of subjects, wherein the search unit prioritizes a subject high in the degree of priority to perform search processing.

9. The image processing apparatus according to claim 1, further comprising a registration unit configured to register a detection result which is not classified by the search unit, as a detection result of a new subject.

10. The image processing apparatus according to claim 2, wherein the search unit performs the different-region search with use of a region vector acquired with use of detection results obtained by the first detection and the second detection.

11. The image processing apparatus according to claim 10, further comprising a recording unit configured to record the region vector, wherein, in a case where detection results obtained by the first detection and the second detection from the first image have been classified into a detection result of a subject of interest, the search unit calculates a search range of the different-region search in the second image with use of the region vector.

12. The image processing apparatus according to claim 11, further comprising a deletion unit configured to, in a case where the region vector is not updated within a preliminarily determined period, delete the region vector from the recording unit.

13. The image processing apparatus according to claim 1, further comprising a recording unit configured to acquire information indicating a change of position or orientation of an image capturing unit during each of the first image and the second image being acquired and to record a forbidden area calculated with use of a detection result which the search unit has not classified into a subject of interest in the first image and the acquired information, wherein, in search processing for a subject of interest, the search unit does not use a detection result belonging to the forbidden area in detection results obtained from the second image.

14. The image processing apparatus according to claim 13, further comprising:

a motion vector calculation unit configured to calculate a motion vector in an image based on the first image, the second image, and the acquired information; and a deletion unit configured to, in a case where the motion vector corresponding to the forbidden area exists, delete the forbidden area from the recording unit.

15. The image processing apparatus according to claim 14, wherein the recording unit acquires distance information related to each of the first image and the second image, and wherein, in a case where a change of the distance information corresponding to the forbidden area is greater than a threshold value, delete the forbidden area from the recording unit.

16. The image processing apparatus according to claim 14, wherein, in a case where a detection result belonging to the forbidden area in the second image is not obtained, the deletion unit deletes the forbidden area from the recording unit.

17. The image processing apparatus according to claim 1, wherein, depending on a detection result of a first region in the first image, the search unit adjusts the threshold value concerning a second region in the first image or a subsequent image.

18. The image processing apparatus according to claim 17, further comprising an area determination unit configured to, in a case where a detection result of the first region exits in the first image, determine an area based on the detection result of the first region, wherein, only in a case where a detection result of the second region in the first image or a subsequent image exists in an area determined by the area determination unit, the search unit performs adjustment of the threshold value concerning the second region.

19. The image processing apparatus according to claim 18, further comprising a labeling processing unit configured to acquire a label map for each subject with respect to an acquired image, wherein the area determination unit performs area determination with use of the label map.

20. The image processing apparatus according to claim 18, wherein the area determination unit performs area determination with use of a region vector.

21. An image capturing apparatus comprising the image processing apparatus according to claim 1.

22. A control method that is performed by an image processing apparatus which acquires a captured image and processes the image, the control method comprising:

detecting a plurality of regions of a subject from the image to output a detection result; and determining a degree of reliability of detection of the detection result; and searching for, with use of a detection result obtained from a previously acquired first image, a detection result which is obtained from a current second image, and classifying detection results, wherein, in the searching, in a case where different-region search, which uses detection results of different regions between the first image and the second image, each of which the degree of reliability is greater than a threshold value from among detection results, and identical-region search, which uses detection results of an identical region between the first image and the second image, are performed, the identical-region search is performed in preference to the different-region search, wherein, in a case where, in the first image, there are detection results classified into a plurality of subjects, the search unit performs search processing for each plurality of subjects in the second image, and wherein a detection result classified into a first subject is not used in detection results obtained from the second image, for search processing for a second subject.

23. A non-transitory computer-readable storage medium storing computer-executable instructions that, when executed by a computer of an image processing apparatus which acquires a captured image and processes the image, cause the computer to perform a method comprising:

detecting a plurality of regions of a subject from the image to output a detection result; and determining a degree of reliability of detection of the detection result; and searching for, with use of a detection result obtained from a previously acquired first image, a detection result which is obtained from a current second image, and classifying detection results, wherein, in the searching, in a case where different-region search, which uses detection results of different regions between the first image and the second image, each of which the degree of reliability is greater than a threshold value from among detection results, and identical-region search, which uses detection results of an identical region between the first image and the second image, are performed, the identical-region search is performed in preference to the different-region search, and wherein, in a case where, in the first image, there are detection results classified into a plurality of subjects, the search unit performs search processing for each plurality of subjects in the second image, and wherein a detection result classified into a first subject is not used in detection results obtained from the second image, for search processing for a second subject.

* * * * *